United States Patent
Nance

(10) Patent No.: US 11,416,871 B2
(45) Date of Patent: Aug. 16, 2022

(54) METHOD FOR DETERMINING DATA TO BE TRANSMITTED OFF AIRCRAFT FOR PROCESSING OF AIRCRAFT WEIGHT AND CENTER OF GRAVITY INFORMATION

(71) Applicant: C Kirk Nance, Keller, TX (US)

(72) Inventor: C Kirk Nance, Keller, TX (US)

(*) Notice: Subject to any disclaimer, the term of this patent is extended or adjusted under 35 U.S.C. 154(b) by 205 days.

(21) Appl. No.: 16/552,383

(22) Filed: Aug. 27, 2019

(65) Prior Publication Data

US 2019/0385174 A1 Dec. 19, 2019

Related U.S. Application Data

(60) Continuation-in-part of application No. 15/917,149, filed on Mar. 9, 2018, which is a division of application No. 14/924,332, filed on Oct. 27, 2015, now Pat. No. 10,089,634.

(51) Int. Cl.
*G06Q 30/00* (2012.01)
*G01G 19/07* (2006.01)

(52) U.S. Cl.
CPC ........... *G06Q 30/018* (2013.01); *G01G 19/07* (2013.01)

(58) Field of Classification Search
CPC ...... G06Q 30/018; G01G 19/07; G01M 1/125
See application file for complete search history.

(56) References Cited

U.S. PATENT DOCUMENTS

| 2006/0220918 A1* | 10/2006 | Stockwell | G01G 19/07 340/960 |
| 2008/0119967 A1* | 5/2008 | Long | G01G 19/07 701/3 |
| 2015/0241295 A1* | 8/2015 | Fuscone | B64D 45/00 701/124 |

* cited by examiner

*Primary Examiner* — Marthe Y Marc-Coleman
(74) *Attorney, Agent, or Firm* — Brian K. Yost; Decker Jones, PC

(57) ABSTRACT

An aircraft operation method of providing weight and center of gravity information is used to dispatch the aircraft. The aircraft has telescoping landing gear struts and strut seals that interfere with the free movement of the strut. An event trigger signaling departure is detected from aircraft operations at a loading area. Internal strut pressure is measured and recorded upon detection for a period of time as the aircraft moves away. The recorded pressure measurements are transmitted to a first off-aircraft computer, which determines the total weight and center of gravity of the aircraft and provides the information to an operator of the aircraft.

37 Claims, 13 Drawing Sheets

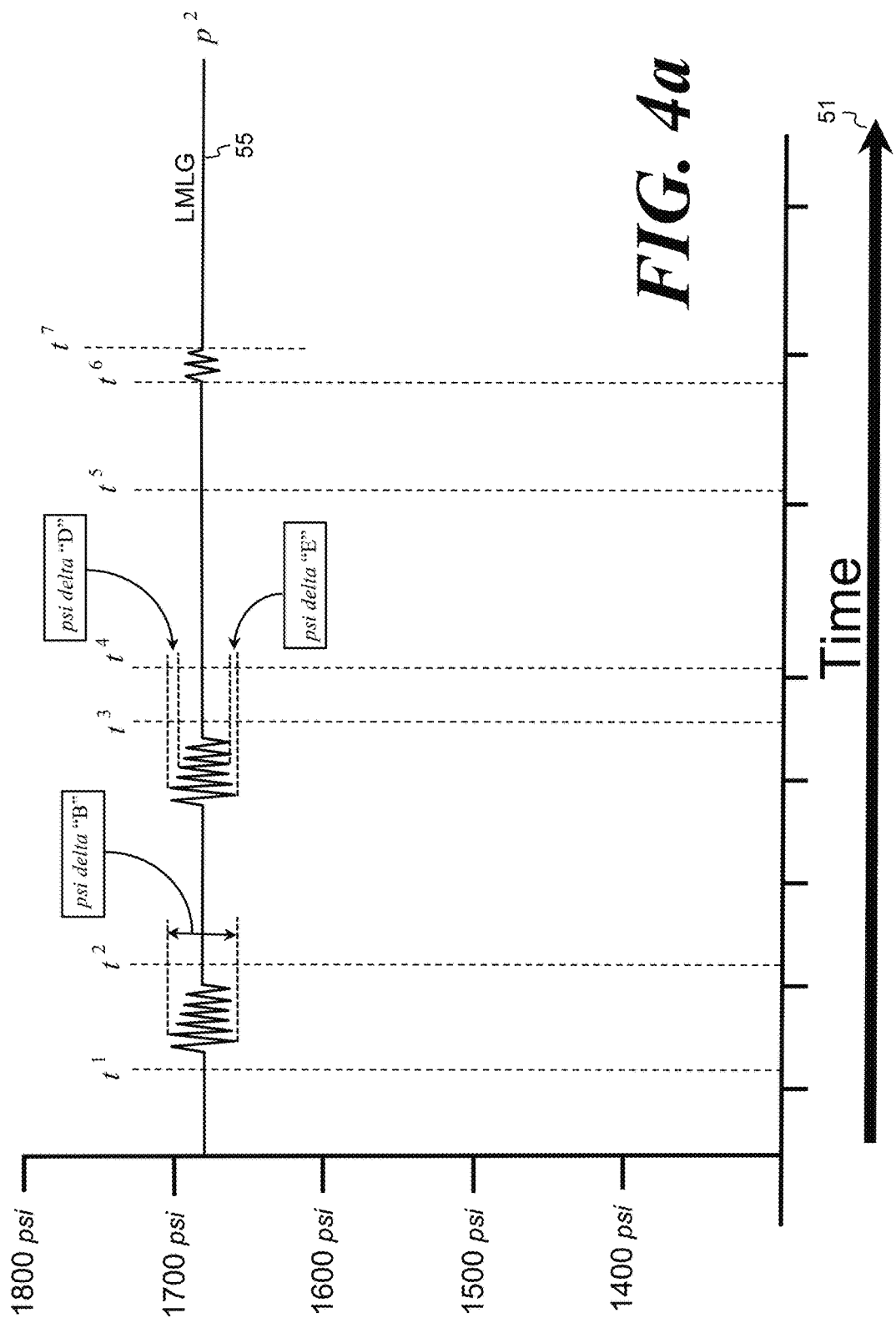

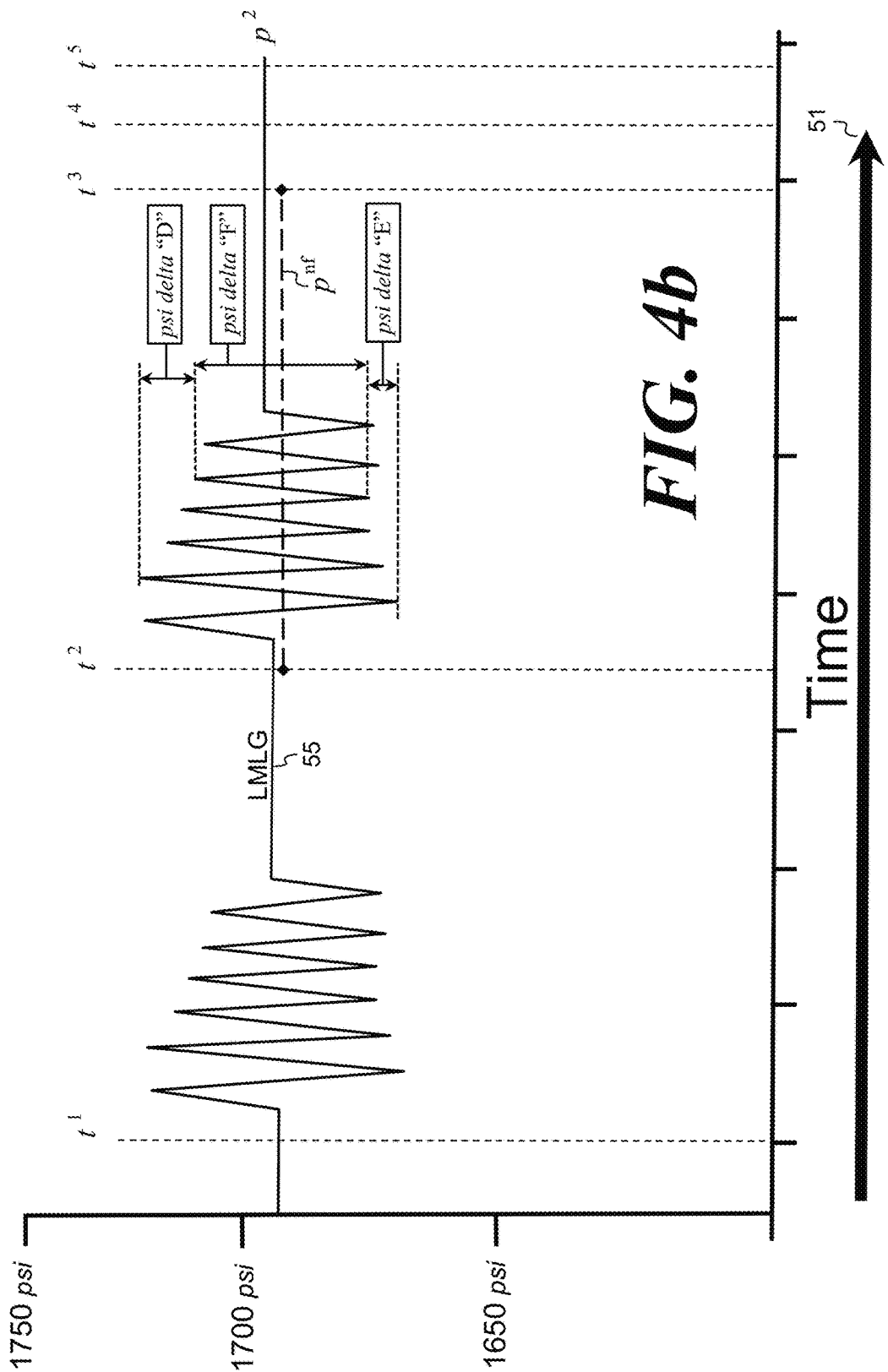

METHOD FOR DETERMINING DATA TO BE TRANSMITTED OFF AIRCRAFT FOR PROCESSING OF AIRCRAFT WEIGHT AND CENTER OF GRAVITY INFORMATION

This application is a continuation-in-part application of U.S. patent application Ser. No. 15/917,149 filed Mar. 9, 2018, which is a divisional application of Ser. No. 14/924,332, filed Oct. 27, 2015.

FIELD OF THE INVENTION

The present invention relates to methods and apparatus used to measure aircraft Weight and Center of Gravity, including an on-aircraft computer to capture un-filtered landing gear data, and a first off-aircraft computer to process and refine the captured landing gear data, to identify and correct for un-recognized pressure errors caused by landing gear strut seal friction; for subsequent information delivery to a second off-aircraft computer operated by an airline.

BACKGROUND OF THE INVENTION

For safe operation of an aircraft, the weight of the aircraft must be determined prior to take-off. Airlines (also referred to as: FAA/Part 121 "Air Carriers") have strict departure schedules, which are maintained to maximize aircraft utilization each day. Today's airline operations typically do not place fully loaded aircraft upon scales, as a means to measure the aircraft weight, and the distribution of that weight, commonly referred to as the aircraft Center of Gravity ("CG"), prior to an aircraft's departure ("dispatch") from an airport gate.

On any single day within the United States, airlines average 27,038 scheduled departures; where all of these air carriers must determine the weight and CG for each aircraft prior to departure. Airlines around the world operate on very strict time schedules. Even a short departure delay occurring early in the day can have a ripple effect and create scheduling problems throughout the airline's remaining flight schedule. Aircraft load planning is a crucial part of keeping an airline operating on schedule. A scheduled aircraft departure will commence its load planning process up to one year prior to the actual flight. Airlines do not offer ticket sales for a flight more than twelve months prior to the flight. As each ticket for a scheduled flight is purchased, the average passenger weight and average checked bag weights are assigned for each ticketed passenger into a computer program, continually updating throughout the year the planned load for that flight. Aircraft have a Maximum Take-Off Weight "MTOW" Airline load planning procedures use weight assumptions as to the weight of passengers and baggage loaded onto the aircraft, provided by Aviation Regulatory Authorities, to stay below the aircraft MTOW limitation.

An accurate determination of take-off weight is important in dispatching and executing the take-off of the aircraft. In planning the take-off of the aircraft, the pilots rely on the accuracy of the take-off weight of the aircraft to determine the proper aircraft speed needed at take-off and the length of the runway required to reach that speed. A heavier aircraft requires a higher speed to take-off, and a longer runway to reach that speed, than does a lighter aircraft of the same model. If the aircraft weight is incorrect, then the take-off determinations of speed and runway length will also be incorrect. If the physical runway is shorter than what is needed, the aircraft could crash on take-off.

Aircraft weights are limited by Federal Aviation Administration "FAN" Regulation. The FAA is the Regulatory Authority which regulates the design, development, manufacture, modification and operation of all aircraft operated within the United States, and will be referenced along with the term "Regulatory Authority" to indicate both the FAA and/or any governmental organization (or designated entity) charged with the responsibility for either initial certification of aircraft or modifications to the certification of aircraft. Examples of Regulatory Authorities would include: European Aviation Safety Agency "EASA", within most European countries; Transport Canada, Civil Aviation Directorate "TCCA", in Canada; Agência Nacional de Aviação Civil "ANAC" in Brazil; or other such respective Regulatory Authority within other such respective countries.

FAA Regulations (provided in the Code of Federal Regulations) are the governmental regulations, which detail the requirements necessary for an aircraft to receive certification by the Regulatory Authority within the United States. These would be equivalent to such regulations within the Joint Aviation Regulations "JARs" which are used in many European countries.

Title 14 of the Code of Federal Regulations, Part 25 refers to regulations, which control the certification of Air Transport Category aircraft ("Part 25 aircraft".) Part 25 aircraft include most of the commercial passenger aircraft in use today. For example, Part 25 aircraft include: Boeing model numbers: 737, 747, 757, 767, 777 and 787; Airbus model numbers: A320, A330, A340, A350 and A380. The FAA regulations allow for control mechanisms to assure Part 121 air carriers manage aircraft loading procedures to confirm at the completion of the loading process that the aircraft load distribution remains within the aircraft's certified forward and aft CG limits.

In particular:
Title 14—Code of Federal Regulations:
Part 121—695, Subparagraph (d)
§ 121.695 Load Manifest: All Certificate Holders
The load manifest must contain the following information concerning the loading of the airplane at takeoff time:
(a) The weight of the aircraft, fuel and oil, cargo and baggage, passengers and crewmembers.
(b) The maximum allowable weight for that flight that must not exceed the least of the following weights:
 (1) Maximum allowable takeoff weight for the runway intended to be used (including corrections for altitude and gradient, and wind and temperature conditions existing at the takeoff time).
 (2) Maximum takeoff weight considering anticipated fuel and oil consumption that allows compliance with applicable en route performance limitations.
 (3) Maximum takeoff weight considering anticipated fuel and oil consumption that allows compliance with the maximum authorized design landing weight limitations on arrival at the destination airport.
 (4) Maximum takeoff weight considering anticipated fuel and oil consumption that allows compliance with landing distance limitations on arrival at the destination and alternate airports,
(c) The total weight computed under approved procedures.
(d) Evidence that the aircraft is loaded according to an approved schedule that insures that the center of gravity is within approved limits.
(e) Names of passengers, unless such information is maintained by other means by the certificate holder.

If an airline is found to be operating a Regulated aircraft with weights in excess of the aircraft's certified weight limitations, that airline is subject to Federal penalties and fines. It is a violation of Federal Law to knowingly operate an aircraft, when the aircraft weight has exceeded any of the Original Equipment Manufacture's ("OEM's") certified weight limitations.

In today's airline operations, aircraft weight determinations are typically not measured, but are instead "computed" based on a compilation of various weight assumptions added to the empty weight of the aircraft. This method of computing the aircraft weight, based upon the summing of various assumed weight elements to a previously measured empty aircraft weight, is often referred to as the Load Build-Up Method and in this description shall continue to be referred to as the "LBUM".

The FAA issued Advisory Circular AC120-27B in October 1990 and since has issued revisions through the most recent issue AC120-27F, each offering guidance for an approved method to determine the aircraft weight by "computations" which are independent of any requirement to measure of the weight of a an aircraft fully loaded with passengers. The approved methods do not guarantee an accurate weight, but merely that the airline has followed Regulatory Authority's approved procedures to determine the weight of the aircraft. The fully loaded weight of the aircraft is computed by a process of compiling the weights of various payload items based upon FAA "designated" average weights, for the varying elements such as passengers, carry-on baggage, checked baggage, crew weight; along with cargo weight and the weight of fuel loaded; onto a previously measured empty aircraft weight. The FAA's AC120-27E designated weight assumptions/allocations for airline passengers and baggage are:

| | |
|---|---|
| Average passenger weight - summer | 190.0 lb. |
| Average passenger weight - winter | 195.0 lb. |
| Average bag weight | 28.9 lb. |
| Average heavy bag weight | 58.7 lb. |

All air carriers must have FAA approved procedures in place (an approved "loading schedule") which the air carrier will follow such procedures to insure each time an aircraft is loaded, the load will be distributed in a manner that the aircraft CG would remain within the forward and aft CG limitations. The FAA and the specific airline develop these procedures, which are often referred to as "Loading Laws" and when implemented define how the aircraft is loaded for each departure.

The most recent FAA update is AC120-27F, issued in May, 2019; to replace the prior version: "27E" dated 2005. Typically such revisions have modified the methods in which to determine the assumptions for the averaged passenger and baggage weights. The United States population has become increasingly heavier over the years; thereby the individual assumed weight of each passenger on these aircraft has become heavier. Airlines throughout the United States with approved weight and balance programs are temporarily allowed to continue with use of the guidance offered within "27E".

In the May 2019 revision to AC120-27F, the FAA significantly changed their position of historically providing to airlines the average weights for passengers and bags. Regulatory authorities have struggled with the diversities and steady trend of increases in the typical weight of airline passengers; as well as the inconsistencies in various airline policies whether to charge or not charge additional fees for checked baggage, while carry-on items are not subject to additional fees; resulting in passengers bringing more baggage into the aircraft cabin, which additional weight of that baggage becomes part of the passenger's assumed weight.

Regulatory authorities have decided to no longer provide and publish the average weight for airline passengers and their baggage, but instead use the average U.S. population weights determined by CDC/National Health and Nutrition Examination Survey (NHANES). The FAA has temporarily allowed airlines with currently approved Weight and Balance Control Programs to continue under a "grandfathered" status. When this grandfathered status expires, airlines will be required to perform independent surveys to determine the average weights of their passengers and baggage; with emphasis as to differences in passenger weights related to the regions of the country they typically fly, and the seasonal weather changes that tend to have passengers wearing more clothing, and packing more items within their baggage.

AC120-27F

Subject: AIRCRAFT WEIGHT AND BALANCE CONTROL

Date: May 6, 2019

Initiated By: AFS-200/AFS-300

1.1 Purpose of This Advisory Circular (AC).

1.1.1 This AC provides operators with guidance on how to develop and receive approval for a Weight and Balance (W&B) control program for aircraft operated under Title 14 of the Code of Federal Regulations (14 CFR) part 91 subpart K (part 91K), and parts 121, 125, and 135.

1.12 This AC presents recommendations for an acceptable means, but not the only means, to develop and receive approval for a W&B control program, and includes guidance for using average and estimated weights in accordance with part 121, § 121.153(b) and other applicable sections of parts 91K, 121, 125, and 135. This AC contains guidance that is not legally binding in its own right and will not be relied upon by the Department of Transportation (DOT) or the Federal Aviation Administration (FAA) as a separate basis for affirmative enforcement action or other administrative penalty. Moreover, conformity with this guidance document (as distinct from existing statutes and regulations) is voluntary only, and nonconformity will not affect rights and obligations under existing statutes and regulations.

Note: Per part 125, § 125.91(b), no person may operate an airplane in a part 125 operation unless the current empty weight and center of gravity (CG) are calculated from the values established by an actual weighing of the airplane within the preceding 36 calendar-months.

3.1.1 What Standard Average Passenger Weights Should an Operator Use?

3.2.1.1 The standard average passenger weights are based on data from U.S. Government health agency surveys. An operator may use the example table in Table 3-1 in association with the Centers for Disease Control (CDC) weights to establish their standard average weights. The first column in Table 3-1 are CDC/National Health and Nutrition Examination Survey (NHANES) weights without summer or winter clothing weights . . . .

3.2.1.2 The operator will use the third column labeled "Standard Average Weight" in Table 3-1 to enter in their standard average weight per passenger based on seasonal clothing variance. The standard average weight is calculated by adding the CDC/NHANES weights in the first column and the clothing weights located the middle column. The clothing weights are 5 pounds for summer clothing, and 10 pounds for winter clothing. Where no gender is given, the standard average passenger weights are based on the assumption that 50 percent of passengers are male and 50 percent of passengers are female.

3.3.5 What Standard Average Weights Should an Operator Use for their Baggage Weights? An operator will use the survey methods described above to determine their standard average baggage weight. Once the operator has completed the survey, the operator will update their OpSpecs with the appropriate weights as well as update their manuals reflecting their standard baggage weights.

3.3.5.1 If an operator chooses not to survey their bags, the operator has the option of using actual weights as described in paragraph 3.4.

3.3.6 What is a Heavy Bag? A heavy bag is considered any bag that weighs more than 50 pounds but less than 100 pounds. An operator should account for a heavy bag by using one of the following weights:

1. An average weight based on the results of a survey of heavy bags, or

2. The actual weight of the heavy bag.

An aircraft is typically supported by plural and in most cases three pressurized landing gear struts. The three landing gears are comprised of two identical Main Landing Gear ("MLG") struts, which absorb landing loads; and a single Nose Landing Gear ("NLG") strut used to balance and steer the aircraft as the aircraft taxi on the ground. Designs of landing gear incorporate moving components, which absorb the impact force of landing. Moving components of an aircraft landing gear shock absorber are commonly vertical telescopic elements. The telescopic shock absorber of landing gear comprise internal fluids, both hydraulic fluid and compressed Nitrogen gas, and function to absorb the vertical descent forces generated when the aircraft lands.

While the weight of the aircraft is resting on the ground, the weight of the aircraft is "suspended" upon the three pockets on compressed gas within the landing gear struts. Accurately measuring changes in the landing gear strut internal pressures, will in turn identify the aircraft weight and CG; and identify the distribution and subsequent re-distribution of aircraft loads.

Use of aircraft landing gear pressure to measure the weight supported by the landing gear strut is similar to use of a hydraulic load cell to measure weight. Pressure measured within a hydraulic load cell is measured as psi "pounds per square inch."

$$(p \div si = psi)$$

(pounds of weight supported÷square inches of surface area, of vessel=psi)

When using a reverse of this equation, the psi within the landing gear should correlate to the pounds of weight supported, when psi is multiplied times the square inches of surface area, being the horizontal cross-section of the landing gear strut cylinder.

$$(\text{pounds of weight supported} = psi \times si)$$

To assist in avoiding confusion, throughout this description strut pressure will continued to be referenced as psi, though the sensors used to measure pressure within the landing gear record and transmit a signal in millivolts, which is subsequently converted to psi with use of a specific algorithm referred to as the "conversion key."

Aircraft landing gear might be considered as a similar load-cell device, but are different in that the landing gear strut has a variable volume, and contains a compressible gas, which allows telescopic movement. Compresses gas and fluid pressure is maintained within the telescopic strut by O-rings seals. The characteristics of the typical O-ring seal generate resistance to telescopic movement by the frictional forces of the seals. Landing gear strut seal friction can falsely distort the measured pressure, associated with the pounds of weight supported. A determination of a respective weight supported by a static aircraft landing gear, using a measured pressure within the respective landing gear strut, without correction for landing gear strut seal friction, can result in un-realized errors in the associated supported weight.

OnBoard Weight and Balance Systems ("OBWBS") have been available for many years, and many teach the use of measured landing gear pressure to determine the weight of the aircraft. There are no airlines currently using such OBWBSs. The FAA has issued an Advisory Circular AC20-161, offering guidance for use of OBWBS.

AC20-161

Subject: AIRCRAFT ONBOARD WEIGHT AND BALANCE SYSTEMS

Date: Apr. 11, 2008

Initiated by: AIR-130

FORWARD: This advisory circular (AC) gives manufacturers and installers an acceptable means of compliance to meet the installation, operation, and airworthiness requirements for aircraft onboard weight and balance systems (OBWBS).

1-1. Purpose.

a. This advisory circular (AC) will show you how to gain Federal Aviation Administration (FAA) approval of aircraft onboard weight and balance systems (OBWBS). We at the FAA recommend you use additional documents, referenced throughout this AC, to help you show compliance with the regulatory requirements of your type or supplemental type certification program. The documents supplement the engineering and operational judgment used to form the basis of any compliance findings on OBWBS.

b. This AC is not mandatory and does not constitute a regulation. It describes an acceptable means, but is not the only means, to show you how to gain certification for OBWBS. However, if you use the means described in this AC, you must follow it entirely. Because the method of compliance presented is not mandatory, the term "must" applies only to an applicant who chooses to follow this particular method in its entirety.

2-3. OBWBS Accuracy Determination Methods.

a. Takeoff Performance Method (1) This method examines the influence of OBWBS system and operational weight and balance accuracies on aircraft takeoff performance. OBWBS operational accuracies that result in at most a±1.5 knot error change in either $V_1$ or $V_2$ speed, or a 100 foot increase in takeoff or accelerate-stop distance, whichever is greater, are accepted without weight curtailments for OBWBS operational accuracy.

OBWBS operational accuracies that result in greater errors than these require appropriate curtailment.
b. Specific Operations Method . . . .
c. Weight and Balance Procedure Method (Load Buildup Method) . . . .
d. OBWBS Operational Demonstration Method . . . .

Section 2-3, paragraph a. "Takeoff Performance", subparagraph (1), (shown above) relates to one of the four methods, established as an acceptable accuracy tolerance by the FAA. The allowable error tolerance being the weight difference of:

The aircraft weight measured on "calibrated" floor scales,
The aircraft weight measured by OBWBS, with a weight difference being no greater than an increased weight which would increase the aircraft's takeoff speeds of either $V_1$ or $V_2$ by at most±1.5 knot, or a change in the takeoff runway length by more than 100 feet in take-off or stop distance; whichever is greater.

Aircraft takeoff performance charts for the Boeing 737-800 used in this example illustrate $V_1$-$V_R$-$V_2$ Speed changes at 10,000 lb. increments. Using an example takeoff weight of 150,000 lb., with a typical "Flaps 15" setting, the V-Speeds differences results with an increase of 4 knots, from 144 knots to 148 knots, when the takeoff weight is increase by 10,000 lb.; to 160,000 lb. The 4 knot change in V-Speed corresponding to a 10,000 lb. weight increase, equates to 2,500 lb. per knot of changed V-Speed.

AC20-161's prescribed allowance for no more than ±1.5 kts.; corresponds to 3,750 lb. as the allowable weight difference on the Boeing 737-800 aircraft:

10,000 lb.÷4 knots=2,500 lb. per knot 2,500 lb.×1.5 knots=3,750 lb. as the allowable tolerance The Boeing 737-800 has a maximum takeoff weight of 174,200 lb.

3,750÷174,500%=2.15% as the allowable accuracy tolerance.

During aircraft taxi, with periodic braking and acceleration, while aircraft weight remains constant, the landing gear strut pressures will oscillate, evidenced by increases and decreases of strut pressure, from the aircraft's slight vertical movements, generated by the spring reaction against the inertia of the aircraft sprung weight. As the aircraft rolls across un-even sections of the airport taxi-way, the aircraft's weight will bounce while resting atop plural landing gear containing fluid and compressed gas. These vertical bounce movements of the aircraft generate the force needed to overcome the resistance of landing gear telescopic movement caused by strut O-ring seal friction. This telescopic movement will be referred to as "exercising" the landing gear struts. The exercising of the landing gear strut results in changes to the amount of landing gear telescopic extension and its corresponding change to the internal volume contain within the strut. The amount of telescopic extension of the strut (often referred to as "Dimension X") can be determined by measuring the rotational changes of the landing gear torque-link arms. The torque-link incorporates two opposing arms, each connected to the strut cylinder and strut piston and joined by a hinge, and used to prevent the piston from rotating within the cylinder. Changes in the internal volume can also be identified by changes in measured strut pressure.

Large quantities of strut pressure oscillations are measured over time. Smaller segments of the pressure oscillations, allows for reduced quantities of the recorded strut pressure measurements to be captured within specific time segments (ie: windows of the strut pressure—or the "pressure data stream"). Determining the most favorable windows of the pressure measurements over time defines a preferred sequence for the pressure oscillations to be captured, which substantially reduces the amount of pressure data needed to be wirelessly transmitted from the aircraft's on-aircraft computer, to a ground based first off-aircraft computer.

SUMMARY OF THE INVENTION

The present invention provides an aircraft operation method of providing weight and center of gravity information for the dispatching of the aircraft from an airport loading area for a flight of the aircraft. The aircraft has telescoping landing gear struts that support the aircraft at the loading area. The landing gear have strut seals. The strut seals create friction that interferes with the free telescoping movement of the landing gear and inhibits accuracies in weight determinations. The method comprises the steps of: detecting an event trigger from operations of the aircraft at the loading area, the event trigger signaling departure of the aircraft from the loading area; using the detection of the event trigger, measuring and recording internal pressure from the respective landing gear struts with an on-aircraft computer; continuing to measure and record internal pressure from the landing gear struts for a period of time as the aircraft moves away from the loading area on the ground; transmitting the recorded strut pressure measurements for the period of time to a first off-aircraft computer; processing the transmitted recorded strut pressure measurements using the first off-aircraft computer; further processing to filter the strut pressure measurements, and determining the total weight of the aircraft and the aircraft center of gravity using the off-aircraft computer; providing the total weight of the aircraft and the aircraft center of gravity from the first off-aircraft computer to the operator of the aircraft.

In one aspect of the invention, the landing gear strut pressure data is recorded, processed and transmitted from the on-aircraft computer; and the aircraft weight and center of gravity is determined by a first off-aircraft computer.

In another aspect, the landing gear strut pressure data is recorded and transmitted from the on-aircraft computer, and all processing of the pressure data and further determination of aircraft weight and center of gravity by the first off-aircraft computer.

In another aspect, the aircraft comprises a brake on wheels of at least one of the landing gear struts. The step of detecting an event trigger from operations of the aircraft at the loading area further comprises the step of detecting release of the brake.

In another aspect, the aircraft comprises a door for loading of passengers or cargo onto the aircraft. The step of detecting an event trigger from operations of the aircraft at the loading area further comprises the step of detecting closure of the door.

In still another aspect, the step of detecting an event trigger from operations of the aircraft at the loading area further comprises the step of detecting strut telescopic movement using the on-aircraft computer.

In still another aspect, the step of detecting strut telescopic movement using the on-aircraft computer further comprises the step of detecting pressure oscillations in at least one of the landing gear struts.

In still another aspect, at least one of the landing gear struts comprises torque-link arms. The step of detecting strut telescopic movement using the on-aircraft computer further comprises the step of detecting movement of the torque-link arms of the respective landing gear strut.

In still another aspect, the step of detecting movement of the torque-link arms of the respective landing gear strut further comprises the use of a rotation sensor.

In still another aspect, the step of continuing to measure and record internal pressure from the landing gear struts for a period of time as the aircraft moves away from the loading area on the ground further comprises the step of ending the period of time upon the occurrence of a stop recording event.

In still another aspect, the aircraft comprises a brake on wheels of at least one of the landing gear struts. The step of continuing to measure and record internal pressure from the landing gear struts for a period of time as the aircraft moves away from the loading area on the ground further comprises the steps of detecting the release of the brake and ending the period of time upon the detection of the release of the brake plus a specified period of additional time, as the stop recording event.

In still another aspect, the step of continuing to measure and record internal pressure from the landing gear struts for a period of time as the aircraft moves away from the loading area on the ground further comprises the steps of detecting pressure oscillations in at least one of the landing gear struts and ending the period of time upon the end of a specific period of time, as the stop recording event.

In still another aspect, the step of transmitting the recorded strut pressure measurements for the period of time to a first off-aircraft computer further comprises transmitting the recorded strut pressure measurements upon the occurrence of the stop recording event.

In still another aspect, the event trigger is a first event trigger and the period of time is a first period of time. The aircraft operation method further comprises the steps of detecting a second event trigger of aircraft movement that occurs after the first period of time and measuring and recording internal pressure from the landing gear struts for a second period of time; transmitting the recorded strut pressure measurements for the second period of time to the first off-aircraft computer; processing the transmitted recorded strut pressure measurements for the second period of time using the first off-aircraft computer and verifying the total weight of the aircraft and the aircraft center of gravity.

In still another aspect, the step of detecting a second event trigger of aircraft movement further comprises the step of detecting a re-setting of the brake followed by a second release of the brake.

In still another aspect, the step of detecting a second event trigger of aircraft movement further comprises the step of detecting strut telescopic movement using the on-aircraft computer.

In still another aspect, the step of detecting strut telescopic movement using the on-aircraft computer further comprises the step of detecting pressure oscillations in at least one of the landing gear struts.

In still another aspect, the step of measuring and recording internal pressure from the landing gear struts for a second period of time further comprises the step of measuring and recording plural sets of strut pressure oscillations as the aircraft moves over expansion joints in an airport surface.

In still another aspect, the step of measuring and recording internal pressure from the landing gear struts for a second period of time further comprises the step of measuring and recording plural sets of strut pressure oscillations and further comprising the step of identifying nose landing gear strut pressure oscillations and corresponding lagging main landing gear strut pressure oscillations as horizontal movement of the aircraft over expansion joints.

In still another aspect, the step of processing the transmitted recorded strut pressure measurements using the first off-aircraft computer further comprises the step of identifying strut pressure outliers, recognized as ultra-high-pressure peaks and ultra-low-pressure peaks within the pressure oscillation patterns, and removing the pressure outliers.

In still another aspect, the aircraft operation method further comprises the steps of: providing a library of landing gear friction patterns and pressure oscillation profiles; the step of processing the strut pressure measurements using the first off-aircraft computer further comprises the step of comparing the strut pressure measurements to the library of landing gear friction patterns and pressure oscillation profiles; the step of determining the total weight of the aircraft and the aircraft center of gravity using the first off-aircraft computer further comprises the step of using the comparison of strut pressure measurements to the library of landing gear friction patterns and pressure oscillation profiles; and using the library data-base to identify a respective landing gear with irregular friction patterns.

In still another aspect, the aircraft operation method further comprises the steps of: identifying recurring strut pressure outliers, associated to a single respective landing gear strut, in determining the single strut having irregular friction patterns; recording the respective single strut irregular friction patterns in the library; communicating the irregular single strut friction pattern information to the operator of the aircraft.

In still another aspect, the step of providing the total weight of the aircraft and the aircraft center of gravity from the first off-aircraft computer to an operator of the aircraft, further comprises the step of transmitting the total weight of the aircraft and the aircraft center of gravity from the first off-aircraft computer to a second off-aircraft computer used by the operator of the aircraft.

In still another aspect, the aircraft operation method further comprises the step of determining whether to dispatch the aircraft for take-off, using the total weight of the aircraft and the center of gravity of the aircraft, using the first off-aircraft computer.

In still another aspect, the aircraft operation method further comprises the step of validating the planned aircraft take-off weight if the planned aircraft take-off weight or center of gravity is determined within a predetermined range, corresponding to the measured landing gear pressure within each strut.

In still another aspect, the aircraft operation method further comprises the step of validating the planned aircraft take-off weight, if the measured aircraft weight is within ±2% of the aircraft's certified Maximum Take-Off Weight and Performance Take-off Weight and Center of Gravity Limitations.

In still another aspect, the aircraft operation method further comprises the step of invalidating the planned aircraft take-off weight if the planned aircraft take-off weight or center of gravity is not determined within a predetermined range, corresponding to the measured landing gear pressure within each strut.

In still another aspect, the aircraft operation method further comprises the steps of: determining and comparing the measured aircraft weight supported by the aircraft landing gear struts to a planned take-off weight determined by the operator of the aircraft, and determining if the planned aircraft weight is within a predetermined range of the measured weight; providing the total weight of the aircraft and the aircraft center of gravity from the first off-aircraft computer to an operator of the aircraft for continued operations of the aircraft, which step further comprises the steps of: receiving the aircraft operator's planned take-off weight, determining if the aircraft operator's planned take-off weight is within the predetermined range of the measured weight, transmitting a message to the aircraft operator the planned take-off weight is valid, determining if the planned take-off aircraft weight is not within the predetermined range of the measured weight, transmitting a message to the aircraft operator the planned take-off weight is not valid.

In still another aspect, the comparison of the measured aircraft weight to the planned aircraft weight accomplishes an automated-survey of the passenger and baggage weights with each aircraft departure; which step further comprises the steps of:

1. measuring the total weight of the fully loaded aircraft,
2. subtracting the previously measured and known empty weight of the aircraft,
3. subtracting the measured weight of the fuel,
4, subtracting the known weight of the in-flight catering items,
5. subtracting the known weight of the potable water onboard,
6. subtracting the known weight of the flight and cabin crew members,
7. subtracting the measured weight of all loaded cargo items;
8. resulting with the remaining non-subtracted weight being the weight of the passengers and baggage.

The airline's load manifest records the number of passengers and checked bags for each flight. Over numerous flights, each with different numbers of passengers and checked bags; software algorithms within the Data Service provider processes the non-subtracted weights compared to passenger and bag counts, to determine the typical average passenger weight (including carry-on items) and checked bag weights. The airlines' flight manifest lists the departure city and arrival city, often referred to as the "city pairs" further allowing the automated-surveyed to determine the average passenger and bag weights and be categorized to the routes, city pairs, time of day, and season of the year, being traveled.

In still another aspect, the step of transmitting the recorded strut pressure measurements for the period of time to a first off-aircraft computer further comprises the step of utilizing a wireless communications link.

In still another aspect, the step of transmitting the recorded strut pressure measurements for the period of time to a first off-aircraft computer further comprises the step of utilizing a cellular telephone communications link.

In still another aspect, the step of transmitting the recorded strut pressure measurements for the period of time to a first off-aircraft computer further comprises the step of utilizing a Wi-Fi communications link.

In still another aspect, the aircraft operation method further comprises the step of determining the amount of friction of the landing gear strut seals, which friction inhibits accuracies in weight determinations, in a scale of measurement correlated to pounds.

In still another aspect, the aircraft operation method further comprises the step of determining the amount of friction of the landing gear strut seals, which friction inhibits accuracies in weight determinations, in a scale of measurement correlated to kilograms.

BRIEF DESCRIPTION OF THE DRAWINGS

Although the features of this invention, which are considered to be novel, are expressed in the appended claims, further details as to preferred practices and as to the further objects and features thereof may be most readily comprehended through reference to the following description when taken in connection with the accompanying drawings, wherein:

FIG. 4a is with an enlarged section of FIG. 4 with a graph showing LMLG strut pressure profile over elapsed time, received by the first off-aircraft computer, showing the LMLG pressure oscillation extremes, which identify pressure outliers; during the period of the aircraft push-back from the gate, and subsequent taxi from the gate.

FIG. 4b is with a further enlarged section of FIG. 4 with a graph showing LMLG strut pressure profile over elapsed time, received by the first off-aircraft computer, with the LMLG pressure oscillations showing additional detail of the pressure outliers, and further averaging the non-outlier pressures to identify a single pressure, equivalent to supported weight, net of friction.

DETAILED DESCRIPTION OF THE PREFERRED EMBODIMENT

Figure 1:
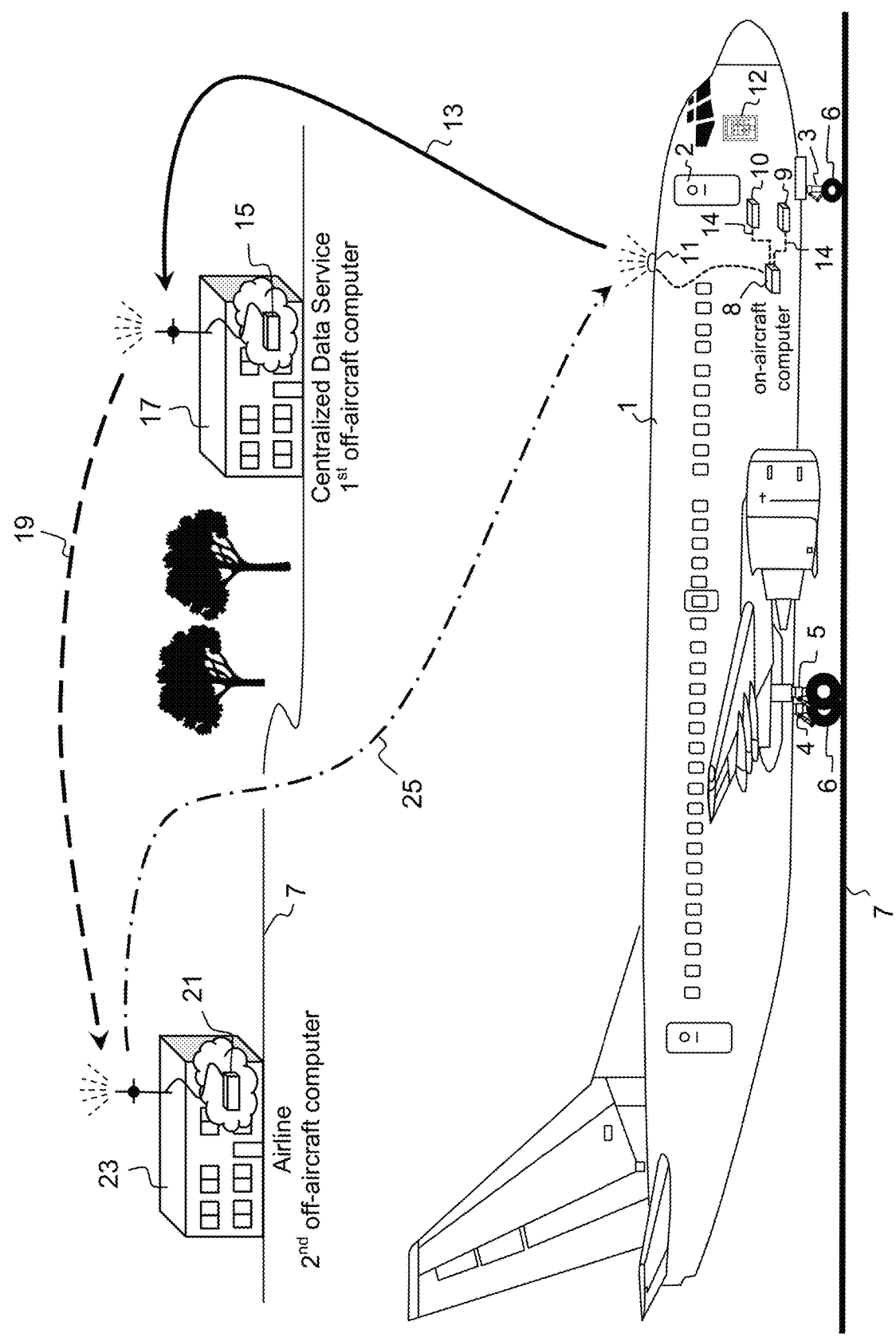
FIG. 1 is a side view of a typical Boeing 737-800 transport category aircraft, with Nose Landing Gear (NLG), Left Main Landing Gear (LMLG) and Right Main Landing Gear (RMLG) deployed, while resting on the ground; with an on-aircraft computer which transmits un-filtered landing gear pressure and rotation sensor data; and other various components of the invention. Also shown is a Centralized Data Services provider building which houses a first off-aircraft computer, receiving wireless transmissions of specific segments of un-filtered landing gear data, to identify and correct pressure errors cause by strut seal friction, and further determine the aircraft weight and CG. Also shown is an Airline's flight dispatch building, which receives wireless transmissions of the aircraft weight and CG, with subsequent re-transmission of pertinent weight and CG information, back to the aircraft.

The present invention provides methods for efficient identification and capture of preferred sequence of pressure oscillation patterns, by an on-aircraft computer, with further processing by a first off-aircraft computer to filter and remove pressure outliers and asymmetries identified in the high-peak and the low-peak pressure averages; to determine to a single pressure value which directly corresponds to the supported weight. The steps to reduce the amount of captured strut pressure and rotation sensor data, transmitted wirelessly from the on-aircraft computer include:

1. Measurement of respective landing gear strut pressure, over elapsed time
2. Optional measurement of corresponding landing gear torque-link rotation;
3. Capturing a portion (being the preferable patterns of strut pressure oscillation) of the respective landing gear strut pressure and, optionally, corresponding torque-link rotation measurements:
    a. prior to gate departure,
    b. during aircraft movement, such as by push-back, from the gate,
    c. during aircraft taxi-time prior to aircraft take-off;
4. Correlating all respective pressure and rotation measurements with a date and time stamp;
5. Identifying the appropriate segments of recorded pressure and rotation measurements, by automated recognition of the aircraft flight crew's prescribed activation sequence of specific mechanical systems during gate departure at taxi procedures, generating a point in time for the beginning of the segment and sequence for data capture (hereinafter referred to as a "triggering event"), followed by recognition of a subsequent activation of an aircraft's mechanical systems, and/or surpassing a prescribed length of elapsed time; which concludes the segment of the sought after pressure and rotations data measurements. A separate triggering event can be used to conclude the time period of data capture. Triggering events which begin and conclude the time periods of the pressure data capture can include the recognition of some or all of the following actions:
    a. indication that the aircraft cabin door has closed;
    b. indication that the aircraft parking brake has been set;
    c. indication that the aircraft parking brake has been released;
    d. respective strut pressure oscillations;
    e. prescribed period of time from the indication that the aircraft cabin door has closed;
    f. prescribed period of time from the indication that the aircraft parking brake has been engaged;
    g. prescribed period of time from the indication that the aircraft parking brake has been released;
    h. prescribed period of time in which pressure oscillations continue.

The invention provides methods to establish an off-aircraft Centralize Data-base of collected landing gear strut pressure oscillation patterns with corresponding rotation data, supported by sophisticated algorithms defining strut friction profiles, which evaluate the currently measured range of un-filtered landing gear pressure data-streams, recorded and received from the on-aircraft computer during aircraft movement. The first off-aircraft computer further processes the current landing gear data to determine a single pressure value, net of friction, corresponding to the amount of weight supported by a respective landing gear strut.

By selecting a specific window of data, which is sent to the off-aircraft computer, processing times are reduced, allowing weight and balance determinations to be made in real time for the benefit of the flight crew and the aircraft. Also, by sending the selected data to an off-aircraft computer, enhanced processing of the data can occur as data from other aircraft can be used and compared for additional processing.

The present invention utilizes existing aircraft flight crew procedures, which trigger the commencement and conclusion for automated measurement and capture of landing gear strut pressure and rotation sensor data, to further identify the desired window of strut pressure data and strut telescopic extension information, for wireless transmission from the on-aircraft computer.

The present invention provides apparatus and methods of increased automation to expedite airline operations and lower the risk of human error, by reducing interactions with a human and further reducing the amount of wireless data needed for transmission to the first off-aircraft computer Centralized Data-base.

The present invention provides methods within the Centralized Data-base to identify an "off-set value" with conversion to a measurement as pounds, associated with break-out friction, for various types of telescopic landing gear struts.

The present invention provides apparatus and methods with use of a first off-aircraft computer software, to promote the evolution and advancement of software algorithms, which improve the identification and determination of pressure errors caused by strut friction; which substantially reduces the re-certification costs associated with amending software, which has been previously certified by a Regulatory Authority and is residing within an on-aircraft computer.

The present invention provides for a Centralized Data Service provider, using a first off-aircraft computer to compile substantial quantities of strut pressure oscillation patterns from multiple airlines with aircraft landing gear of the identical type, beyond the limited data, which can be accumulated from a single airline, who may operate a limited number of aircraft, within a limited territorial range of temperature and environmental conditions.

The present invention provides apparatus and methods to detect, record, store, package and transmit a unique sequence of landing gear strut pressure and rotation sensor data, to optimize the identification, measurement and further correction for un-seen pressure errors caused by landing gear strut seal friction, which can misrepresent landing gear strut pressure, which is assumed as equivalent to the amount of weight supported, whereas an example is described herein:

As weight is initially applied to a landing gear strut, the pressure within the strut will remain constant and the strut will not telescopically compress, until enough weight has been added to overcome resistance from landing gear strut seal break-out friction. Once break-out friction has been overcome, the strut pressure will begin to increase equivalent to the pounds of weight added, but at parallel and "off-set amount" which is a lower pressure; corresponding to the value of the "friction resistance." When the pressure increases are examined closely it is revealed that the pressure increases are not an even upward slope, nor a smooth curve of pressure increases as additional weight is applied; but rather a stair-step pattern is recognized, as each subsequent step of break-out friction is overcome, Reversely, as weight is removed from the landing gear strut, the pressure within the strut will remain constant until enough weight has been removed for the trapped pressure to overcome break-out friction in the reverse direction. Even though weight has been removed, the resistance of break-out friction will contain a higher pressure within the strut, equivalent to the resistance of break-out friction. Strut pressure will remain artificially high, and decrease from that higher value, in a parallel relationship to the amount of weight removed.

Passengers board an aircraft while the aircraft is parked at a loading area. Loading areas vary depending on the size of the aircraft and the size of the airport. Large aircraft typically load passengers through an elevated boarding gate positioned at a matching height to the aircraft cabin door. Not all airports have elevated boarding gates, thus passengers walk from the airport terminal directly up to the aircraft and board by climbing a portable stairway positioned at the cabin door. Smaller aircraft, often operated by regional airlines, are equipped with cabin doors that are hinged at the bottom of the door, allowing the door to rotate downward to the ground. Regional airline passengers walk directly from the airport terminal to the aircraft and climb step risers, which are molded into the interior side of the cabin door; eliminating the need for a portable stairway. Upon completion of the loading with passengers and baggage, the aircraft parking brake is released, allowing the aircraft to taxi away from the loading area. As used herein, "gate" refers to loading area, whether the aircraft in the loading area is serviced by an elevated boarding gate or something else.

As the aircraft begins to taxi, the weight of the aircraft, suspended atop the three pockets of compressed gas will allow the aircraft to bounce as the landing gear roll over un-even sections of the taxi-way. While such bouncing is welcome to exercise the landing gear struts and overcome strut seal friction, obtaining accurate data and processing that data to obtain weight and balance information is difficult due a variety of factors. For example, when the aircraft brakes are applied to decelerate or stop the aircraft, loads resting upon the MLG will transfer forward to the NLG, changing the pressure within the respective struts. As the aircraft accelerates, loads resting upon the NLG will transfer aft to the MLG; again changing the pressure within the respective struts. As another example, a method to correct for landing gear strut pressure errors caused by the resistance of break-out friction is to average oscillating high-peak and low-peak pressures within the landing gear strut, while the aircraft moves horizontally and the telescopic landing gear struts are exercised. However, break-out friction values are not equivalent in opposing directions. Therefore, additional adjustments to pressure measurements are made to correct for asymmetries to increasing and decreasing strut pressures. Still another example is that seal friction resistance increases when retaining fluids at a higher pressure range. Seal friction resistance decreases when retaining fluids as pressure ranges lower. Further still, strut pressure can be measured at a sample rates from of 100 samples per second, up to 100,000 samples per second. As an example: 10 seconds of pressure data capture can provide 1,000 measurements. The most sophisticated aviation electronics and pressure sensors struggle with issues such as "electronic noise" which can increase errors. Electronic noise can be filtered from pressure data by identifying abstruse pressure values, which are considered outliers; and removing that very small percentage of the 1,000+ strut pressure measurements captured and recorded.

The present invention seeks to overcome the obstacles to obtaining accurate weight and balance information. Several embodiments of the invention are discussed. In a first embodiment there is shown the commencement for the capture of a prescribed sequence of landing gear pressure data, taken as the aircraft is pushed away from the airport gate, typically attached with an aircraft tow-bar and moved by an airport tug. A prescribed sequence of mechanically activated and timed triggers are established to capture pressure data and are initiated by recognition of the closing of the cabin door, with its associated door closed indicator, and subsequent release of the aircraft parking brake identifying the start of aircraft movement, and after a defined period of time concluding the capture sequence of strut pressure data triggered by the pilot re-setting the aircraft parking brake to allow removal of the airport tug and tow-bar; thus identifying an end to this specific segment of aircraft movement prior to the aircraft engine-powered taxi from the gate area.

In a second embodiment there is shown a review of the captured pressure and rotation data, which is analyzed upon completion of the first embodiment. The continued taxi of the aircraft is recognized by short periods of strut pressure oscillations, starting with the NLG rolling over an un-even section of the taxi-way, followed immediately by a similar oscillation by the MLGs rolling over the same un-even surface. This pattern of NLG oscillation followed by MLG oscillation occurs as the aircraft continues to taxi towards the take-off runway.

While the aircraft is in motion, there is no change in aircraft weight other than a small and measured amount of fuel consumed during the taxi period before take-off. Strut pressures will stabilize, as the resistance from friction will work to restrict telescopic movement. Subsequent identification of increases and decreases in strut pressure provides conclusive evidence that seal friction has again been overcome.

To provide an additional cross-reference to confirm seal friction has been overcome, rotation sensors optionally measure changes in the angle of opposing arms for landing gear torque-link. Use of simple geometry relating measured angle changes from torque-link rotation, which corresponds to the length of telescopic extension of the landing gear. Oscillation in rotation sensor measurements will parallel the oscillations in landing gear strut pressures, as strut pressure will change equivalent to changes of volume within the strut.

The present invention, uses both an on-aircraft computer and a first off-aircraft computer; incorporating sophisticated algorithms, with advanced methods to correct for landing gear strut friction, by determining an optimum timing and sequence for confirming landing gear strut seal friction has been overcome, identified, and measured; within a minimal period of time, to reduce disruption and delays to airline flight schedules.

The Boeing 737 Next Generation family of aircraft comprises: 737-600, 737-700, 737-800, and 737-900. The Boeing Company has delivered 6,996 of the 737 Next Generation aircraft as of January 2019. This includes 13,992 MLG which average 6 flights per day, offering the potential of 83,952 Left and Right MLG strut pressure pattern profiles per day, to enter into this invention's 737-NG MLG strut pressure profile Centralized Data-base. The present invention compiles and associates landing gear pressure profiles from landing gear data sources beyond a single aircraft, and beyond just a single airline; allowing for an enhanced ability to compare identical aircraft using identical landing gear designs, to better identify, measure, and correct for pressure distortions caused by strut seal friction. The present invention offers methods to evolve and advance the algorithms used in the interpretation of landing gear strut seal friction patterns and profiling tools, used in measuring and confirming friction values, to increase accuracy for weight determinations on future flights. Use of a first off-aircraft computer by a Centralized Data Service provider, simplifies the pathway for adjustments to the first off-aircraft computer algorithms and software, reducing the long lead-time and costly expense for any re-certification of software programs, residing within on-aircraft computers, that would be required by Regulatory Authorities.

The methods and apparatus described within this new invention, allow for increases to the automated functions of measuring aircraft landing gear strut seal friction and methods to decrease the amount of wireless transmission of landing gear data to the first off-aircraft computer operated by Centralized Data Service, Regulatory Authorities monitor substantial amounts of aircraft weight and CG data, which is compiled and stored, from multiple airlines in their day-to-day flight operations. Aircraft weight and CG information, generated by this invention, and adopted as an "advisory tool", is not part of the airline's and Regulatory Authority's agreed procedures, thus is not required by the Regulatory Authority. The Centralized Data Service provider can use the measured weight data to assist the airline to re-validate their current assumptions for passenger weights and baggage weights, by subtracting the total aircraft weight from other weight elements such as: measured weight of empty aircraft, known fuel quantities, known catering weights, measured cargo weights and known flight crew weights.

The present invention provides a means to define and expedite a method to enhance the accuracy in the determination of an aircraft take-off weight, calculated with use of landing gear strut pressure, and accomplishes this automated task without disrupting airline operations, which might occur if upon the gate departure, the aircraft were delayed during its taxi to the take-off runway.

The present invention offers on-aircraft apparatus and methods utilizing sensors for monitoring the status of various items, such as brake and door components, of the aircraft, as well as collecting un-filtered landing gear strut pressure and torque-link rotation data, with wireless transmissions to update a first off-aircraft computer using a variety of interrelated computer software programs, to create a more efficient capability of identifying and measuring landing gear strut seal break-out friction.

To summarize this invention, apparatus (shown in FIG. 2) and methods (shown in FIGS. 3 through 3a), which are used include:

Pressure sensors to measure landing gear strut pressure

Rotation sensors to measure angle changes at the hinge-point of opposing arms of the landing gear torque-link On-aircraft computer (shown in FIG. 3) with wireless communication capabilities to:
  Monitor status of aircraft cabin door
  Monitor status of aircraft parking brake
  Transmit un-filtered data to a first off-aircraft computer
  Wireless communication of captured data packages including:
    commencement and conclusion of the time segments for capture of landing gear strut pressure and rotation measurements (shown in FIG. 4)

Off-aircraft Centralized Data Service (shown in FIG. 3a) with wireless communication capabilities to:
  Receive captured and time-stamped strut data packages or streams
    Using a respective conversion key, translate pressure millivolt data to psi
    Using another respective conversion key, translate rotation millivolt data to a respective angle of the opposing torque-link arms, to determine Dimension X (shown in FIG. 2)
  Identify strut pressure oscillation patterns NLG o-$N^1$ and MLG o-$M^1$ (shown in FIG. 4)
  Identify high-peak and low peak pressure values
  Identify ultra-high-peak and ultra-low peak pressure values
  Identify rotation of torque-link to confirm change and the amount of change in Dimension X
  Categorize and remove ultra-high-pressure and ultra-low-pressure outliers (shown in FIG. 4a)
  Collect non-outlier high-pressure and low-pressure oscillations values
  Average non-outlier high-pressure and low-pressure oscillations values to determine a single strut pressure value, which is net of friction, and proportional to the amount of weight supported at each respective strut (shown in FIG. 4b)
  Compute aircraft weight and CG, from determined pressure, net of friction errors
  Transmit computed weight and CG data, to the airline Referring now to the drawings, wherein like reference numerals designate corresponding parts throughout the several views and more particularly to FIG. 1 there is shown a side view of a typical Boeing 737-800 transport category "Part 25" aircraft 1, which allows passenger cabin loading through door 2. Aircraft 1 can be operated in a cargo aircraft configuration with a larger door 2 (not shown), to allow loading of larger or palletized cargo. Aircraft 1 is supported by a tricycle landing gear configuration consisting of a single NLG 3, and two identical MLGs, including a LMLG 4 and a RMLG 5 (both MLGs are positioned at the same location longitudinally along the aircraft, but shown in perspective view for this illustration). The Boeing 737-800 is one of the most common commercial aircraft flown worldwide by today's airlines and shall be used as the model aircraft throughout the examples and illustrations described in this invention.

NLG 3, along with LMLG 4 and RMLG 5 distribute the weight of aircraft through tires 6 resting on the ground 7. A processing component used in this invention and attached to aircraft 1 is a data acquisition/transmission on-aircraft computer 8. A device for data entry and indication, which can be used in this invention but not all are required, and attached to aircraft 1 is a digital key-pad with display 12.

Figure 2:
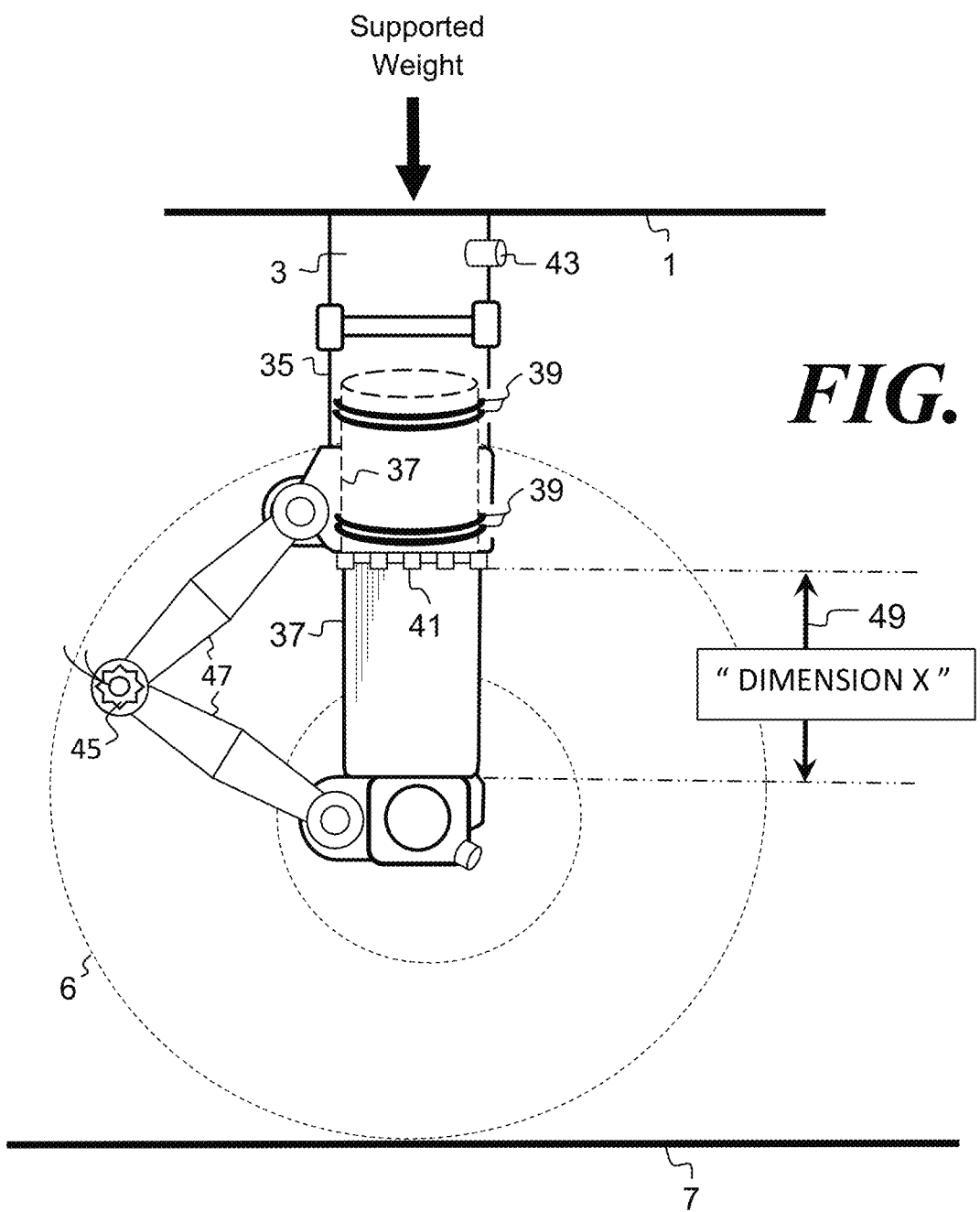
FIG. 2 is a cross-section view of a typical telescopic landing gear, illustrating internal O-ring seals and exterior gland nut, which together retain internal pressure within the pressurized strut; with various elements of the invention attached to the landing gear.
Figure 3:
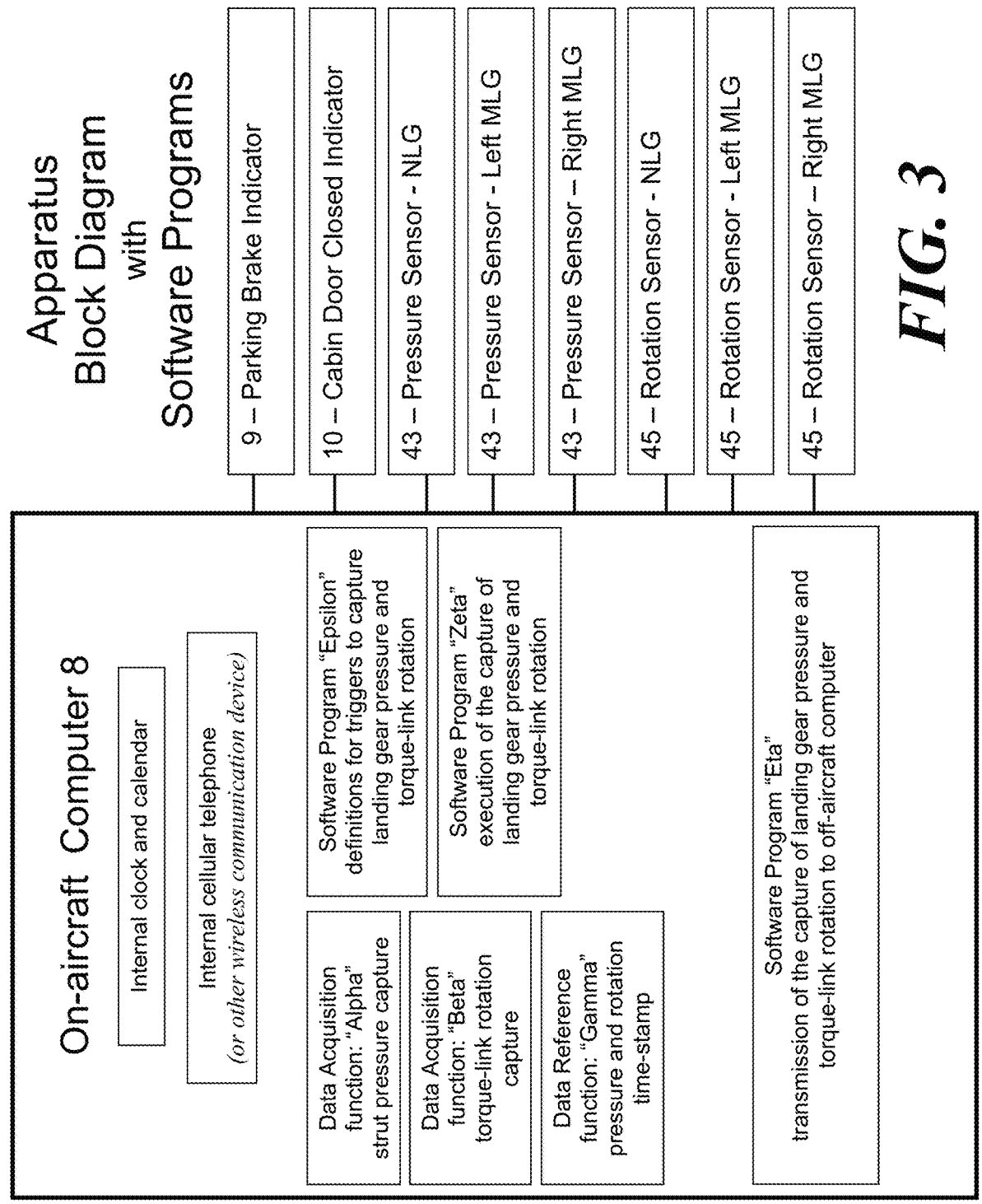
FIG. 3 is an apparatus block diagram illustrating an "on-aircraft" computer equipped with internal clock, calendar and cellular telephone; with inputs from landing gear strut pressure sensors, torque-link rotation sensors, parking brake indicator and cabin door indicator; along with various software programs for measuring pressure landing gear data and further identifying triggers to commence and conclude the capture and storage of specific sequences and segments of un-filtered strut pressure changes, used in the determination for the optimal packaging of pressure and rotation sensor data to be wirelessly transmitted from the aircraft.

Landing gear pressure sensors 43 and rotation sensors 45 (shown in FIG. 2) are attached to landing gears 3, 4, and 5 and are connected to on-aircraft computer 8 (also shown in FIG. 3). On-aircraft computer 8 contains various internal circuitry, algorithms and software programs for the collection and time-stamping of strut pressure and rotation sensor data from respective landing gears 3, 4, and 5.

On-aircraft computer 8 communicates via a wired connection 14 with aircraft parking brake indicator 9 and cabin door closed indicator 10, which are standard components of aircraft 1. On-aircraft computer 8 transmits wirelessly to a first off-aircraft computer 15, via antenna 11. Wireless communication from on-aircraft computer 8 to first off-aircraft computer 15 is shown by "solid arrow" 13 representing un-filtered landing gear pressure sensor and rotation data transmitted to first off-aircraft computer 15. In the example shown, the first off-aircraft computer 15 is housed within the Centralized Data Service provider 17. First off-aircraft computer 15 can be a portable device such as a laptop computer or a handheld computer tablet, capable of computations utilizing sophisticated software algorithms. First off-aircraft computer 15 is not required to be located within the Centralized Data Service provider facility, but have periodic wireless communication capabilities to the data library, which is maintained by Centralized Data Service provider 17. Use of a Centralized Data Service provider 17 allows for the filtering and further refining of aircraft landing gear pressure data. Various levels of data refinement, define the various products that can be delivered to the airline. The airline and Centralized Data Service provider 17 determine the type of information to be delivered to the airline. Transmission of the various products to the airline is shown by "dashed arrow" 19.

A second, optional, off-aircraft computer 21 is housed and operated within airline facility 23. The airline shall determine the subsequent nature of weight and CG information communicated back to the aircraft 1 shown by "dashed-dot arrow" 25. Pilot responsibilities are multiple and occur quickly as an aircraft prepares to take-off. An airline may choose to advise the pilot that the aircraft weight and CG information has been validated as within predetermined level of accuracy, and the aircraft is safe for departure; as opposed to sending information to a pilot that there is a slight weight difference between the planned weight and the measured weight, which might be confusing to the pilot. Reducing such distractions and confusion for the pilots increase the safety in the overall operation of aircraft 1.

Figure 1A:
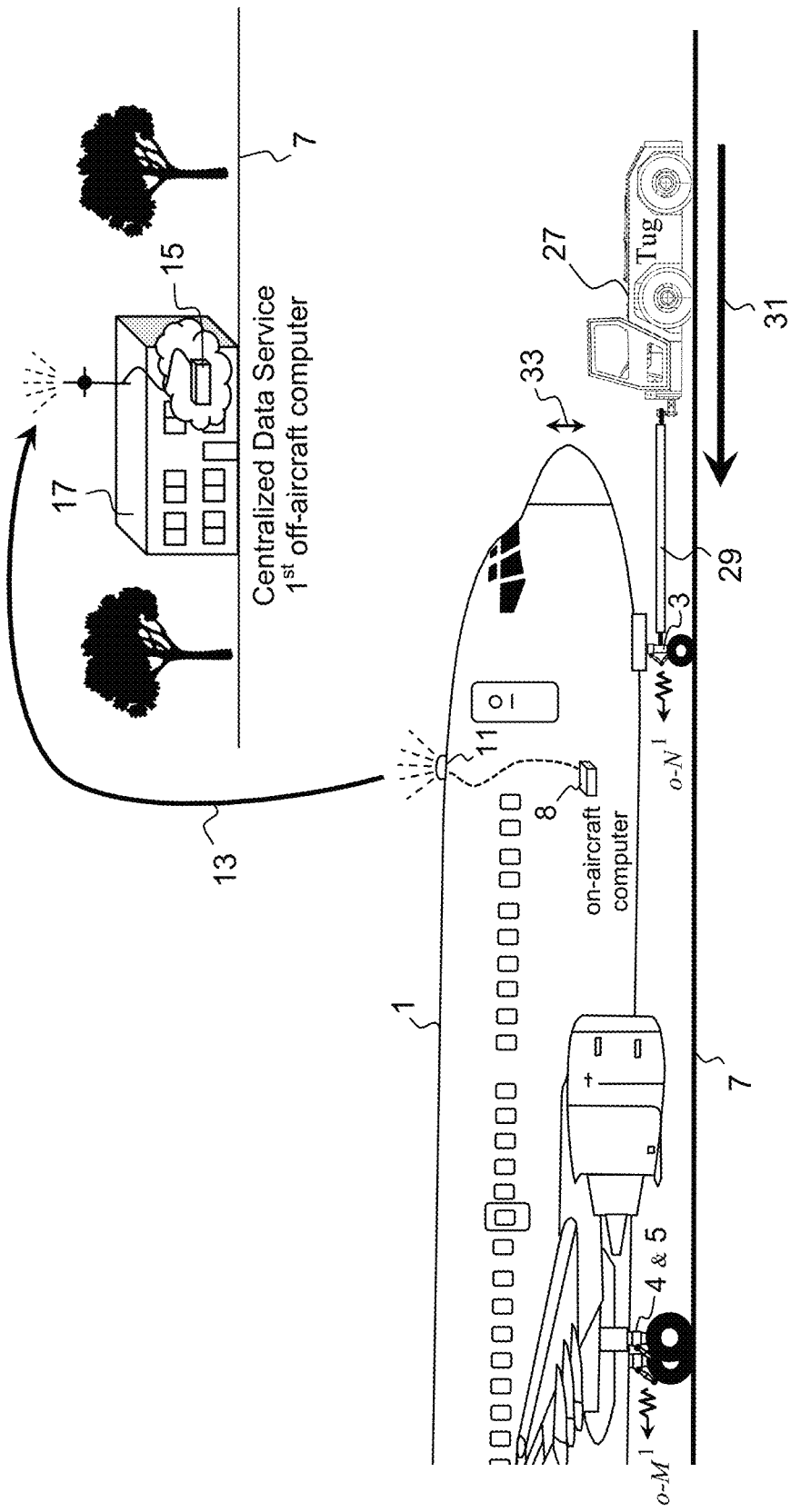
FIG. 1a is an alternate view of the Boeing 737-800 aircraft, with a typical airport tug attached to the NLG by a tow-bar; showing the nose of the aircraft slightly bouncing vertically, as the tug pushes the aircraft horizontally, with NLG and MLGs showing pressure oscillations.

Referring now to FIG. 1a, there is shown a side view of aircraft 1 supported by NLG 3, and LMLG 4 & RMLG 5. A typical airport tug 27 attached to NLG 3 with a typical aircraft tow-bar 29 pushes aircraft 1 horizontally, shown by arrow 31. The nose of aircraft 1 supported atop the virtual spring of compressed gas within telescopic NLG 3 (described in FIG. 2) will cause the nose of aircraft 1 to slightly oscillate or bounce vertically, shown by the double-direction vertical arrow 33. As aircraft 1 moves horizontally, pressure within NLG 3 will oscillate (shown as o-$N^1$) as strut seal friction is overcome. Pressure within MLGs 4 & 5 will also oscillate (shown as o-$M^1$) as suspended weight rocks aft then forward then aft, between NLG 3 and MLGs 4 & 5. During the push-back from an airport gate (gate not shown) on-aircraft computer 8 transmits (shown by solid arrow 13) o-$N^1$ and o-$M^1$ pressure oscillation data to a first off-aircraft computer 15, housed within Centralized Data Service facility 17. Additional landing gear data is sent from on-aircraft computer 8 to first off-aircraft computer 15 (shown in FIG. 5 and FIG. 5a).

Figure 1B:
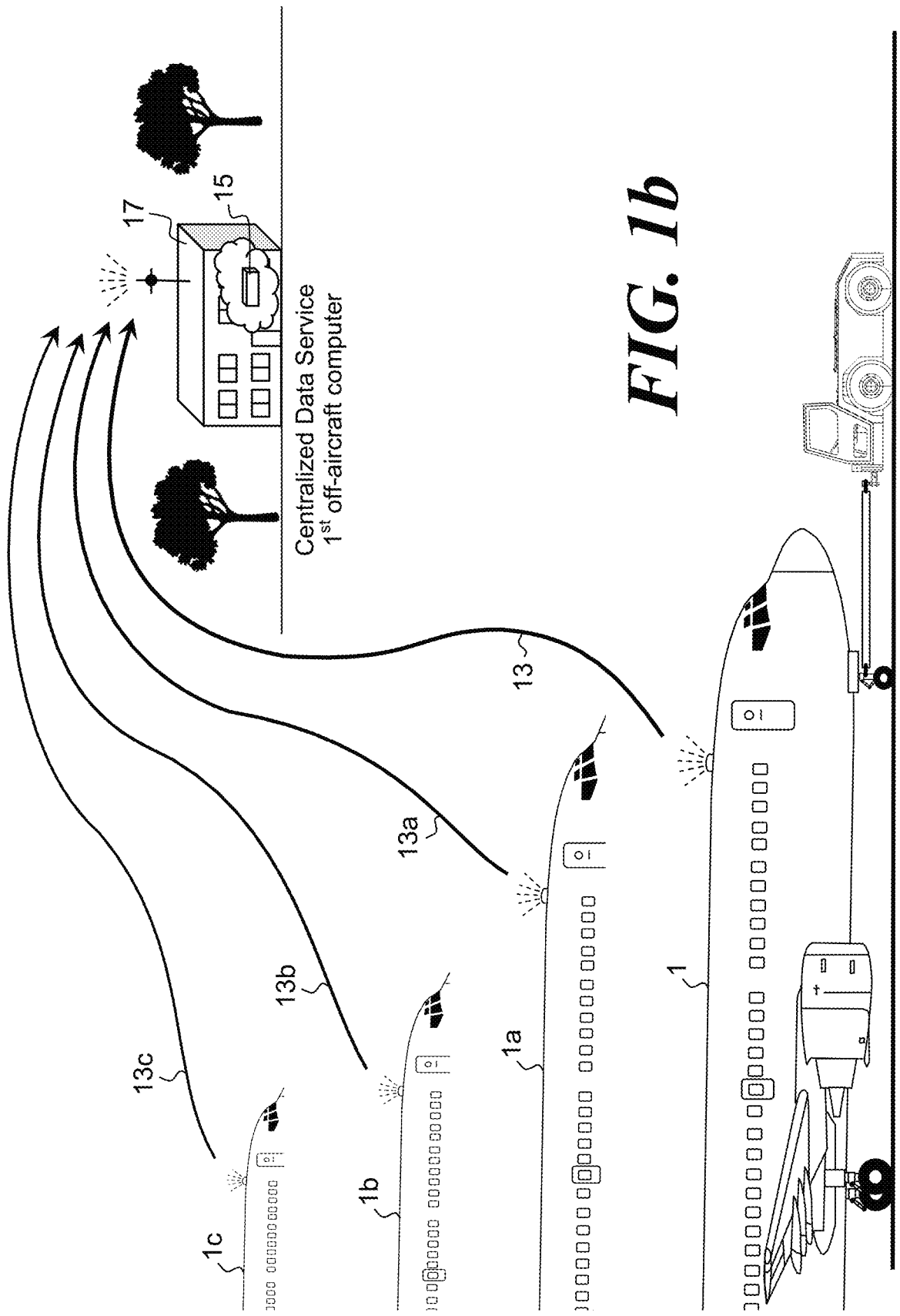
FIG. 1b is an alternate view showing multiple Boeing 737-800 aircraft, each transmitting independent NLG and MLGs un-filtered pressure, to a Centralized Data Service provider.

Referring now to FIG. 1b, there is shown an alternate view of multiple Boeing 737 Next Generations aircraft, each transmitting independent data to a Centralized Data Service 17. As previously shown in FIG. 1, aircraft 1 transmission of wireless communication of unfiltered landing gear data is shown by "solid arrow" 13. Centralize Data Service 17 computer 15 receives data from many B-737NG aircraft, all operating identical landing gear with identical seal configurations (shown in FIG. 2) which maintain pressure within the struts; but seal friction characteristics of each landing gear can be different, identified by slight dissimilarities to the pressure oscillation patterns, while the aircraft taxi (Shown in FIG. 4), caused by variations in seal quality and integrity, due to higher rates of seal wear resulting from better or worse landing gear maintenance practices, by different aircraft operators.

Aircraft 1a transmits unfiltered landing gear data, shown as solid arrow 13a, to Centralized Data Service 17 computer 15.

Aircraft 1b transmits unfiltered landing gear data, shown as solid arrow 13b, to Centralized Data Service 17 computer 15.

Aircraft 1c transmits unfiltered landing gear data, shown as solid arrow 13c, to Centralized Data Service 17 computer 15.

Centralized Data Service 17 maintains an extensive library comprised of an expanding depository of landing gear friction pattern profiles, from identical aircraft. The library also compiles increasing pools for different aircraft types, each with a specific landing gear design, common to that aircraft type. The pools of aircraft pressure patterns are sub-divided into categories defined by a common landing gear design with pressure profiles ranging from congruent friction patterns, to those with excessive asymmetry, when compared to the general population within that pool. Identification of a landing gear friction profile with a significant amount of asymmetry, triggers notification to the aircraft operator of a potential seal problem existing within that specific landing gear, on that specific aircraft. The library provides this additional analysis tool for the Central Data Service 17 to better determine, identify and profile the amount of pressure distortion produced by landing gear strut seal friction, from the next received landing gear pressure data sets, from a specific aircraft type, queued for interpretation and determination of aircraft weight and center of gravity.

Referring now to FIG. 2, there is shown a side view of a typical telescopic landing gear strut 3 comprising the strut outer cylinder 35, in which an internal chrome piston 37 moves telescopically. (In this FIG. 2, the landing gear strut bears reference number 3, however the landing gear strut could also be LMLG 4 or RMLG 5.) Landing gear strut 3 contains a non-compressible fluid and a compressible gas, such as nitrogen, which functions as a compression spring, allowing telescopic movement of piston 37 within cylinder 35. O-ring seals 39 maintain pressure within landing gear strut 3 during the telescopic movement. Pressure sensor 43 measures pressure within the landing gear 3. All weight supported by landing gear 3 is transferred through tire 6, onto the ground 7. The cross-section of landing gear 3 as shown is a simplified illustration used to highlight O-ring seals 39 as the primary source of friction. More complex landing gear designs are common.

Changes to the amount of weight supported by landing gear 3 result in variations to landing gear strut internal pressure, as recorded by pressure sensor 43. As weight is applied to landing gear strut 3, telescopic piston 37 will recede into strut cylinder 35, reducing the interior volume within the telescopic landing gear strut and reducing the value of "Dimension X", which is a measureable length of the exposed chrome finished portion of piston 37, outside of cylinder 35. As weight is applied to strut 3, Dimension X decreases as internal pressure within strut 3 will increases proportionally.

Rotation sensor 45 is attached to the landing gear torque-link 47, an element of the landing gear that prevents strut piston 37 from turning within strut cylinder 35. Rotation sensor 45 measures changes in the angle formed at the hinge point of upper and lower opposing arms of torque-link 47. Measured changes in the angle of torque-link 47 correlate to changes in Dimension X. Variations in Dimension X are illustrated by vertical double-arrow 49.

Boyle's Ideal Gas Law: $P_1V_1=P_2V_2$ confirms that a change in Dimension X is proportional to a change in strut pressure. Identification and measurement of changes in Dimension X allow an alternate means to confirm the landing gear strut has moved telescopically, and verifying seal friction has been overcome with such movement.

Referring now to FIG. 3, there is shown an apparatus block diagram illustrating on-aircraft computer 8, with various sensor inputs and software programs; being part of the apparatus of the invention. Sensor inputs to on-aircraft computer 8 include multiple inputs from respective (NLG 3, Left MLG 4 and Right MLG 5) strut pressure sensors 43 and rotation sensors 45. On-aircraft computer 8 also receives input signals from the aircraft parking brake indicator 9 and aircraft cabin door indicator 10. Indication of the cabin door being closed confirms no additional passengers will board, and the aircraft is preparing to move away from an airport gate. Indication the aircraft parking brake 9 has been released confirms that no additional weight will be added, and the aircraft is ready to move horizontally (hereinafter referred to as: "taxi") away from the gate.

On-aircraft computer 8 is equipped with an internal clock and calendar, to reference the date and time of recorded pressure sensor and torque-link rotation data. Computer 8 is also equipped with a cellular telephone or use of alternate means of wireless communication such as Wi-Fi or Bluetooth; to transmit captured and unfiltered landing gear data from on-aircraft computer 8, to the first off-aircraft computer 15 (shown in FIG. 1).

On-aircraft computer 8 records and stores respective landing gear strut data into a memory-loop, and recorded data is stored for a specified period of time. If the previously recorded and stored data is unused, the on-aircraft computer 8 will over-write that period of recorded data, with subsequently measured and recorded new landing gear data stored in its place. The memory-loop is utilized to conserve memory space within on-aircraft computer 8.

On-aircraft computer 8 has multiple data acquisition and referencing functions, (illustrated in FIG. 4 with Steps described in FIG. 5) which include:
  Data Acquisition function "Alpha" which measures and captures NLG, LMLG and RMLG strut pressure;
  Data Acquisition function "Beta" which measures and captures NLG, LMLG and RMLG torque-link rotation;
  Data Reference function "Gamma" which records NLG, LMLG and RMLG strut pressure and torque-link rotation, with time and date references;

On-aircraft computer 8 has multiple operating software programs, (illustrated in FIG. 4 and described more in FIG. 5) including:
  Software Program "Epsilon" which defines the triggers for the commencement and conclusion of prescribed time sequences for the capture of landing gear pressure and torque-link rotation measurements;
  Software Program "Zeta" which executes the capture of landing gear pressure and torque-link rotation data, according to the triggers cited within Software Program "Epsilon"

On-aircraft computer 8 has data transmission functions, including:
  Data Transmission function "Eta" which communicates the captured, and un-filtered NLG, LMLG and RMLG strut pressure and rotation sensor data, wirelessly to the first off-aircraft computer 15 (shown in FIG. 1), for further processing and refinement. In addition, identifying information is included, such as particular aircraft, and optional location information, such as airport.

Figure 3A:
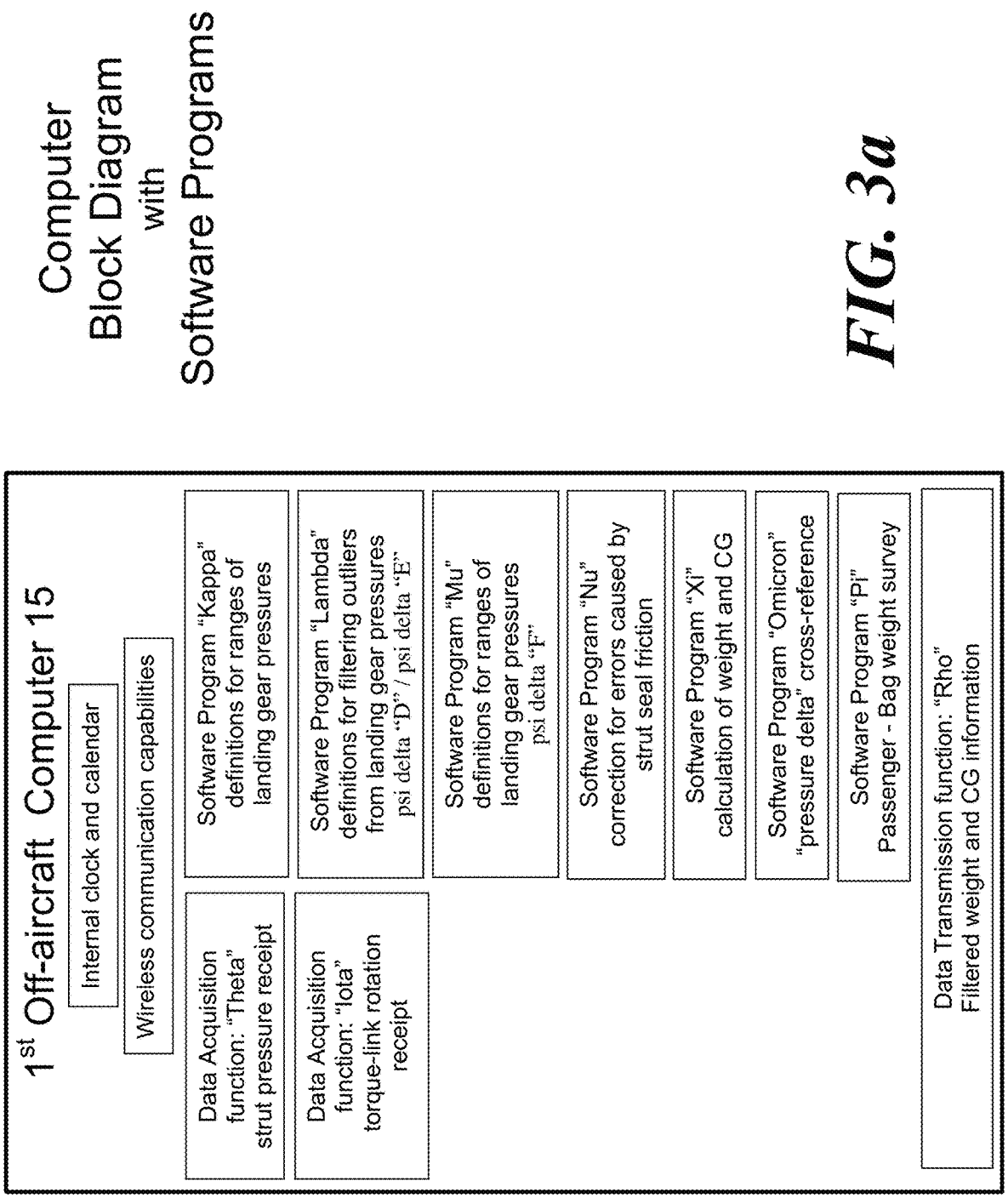
FIG. 3a is an apparatus block diagram illustrating a first "off-aircraft" computer with various software programs used for measuring, filtering, storing and cross-referencing an developed library of landing gear strut seal friction correction values, received from an on-aircraft computer; for processing the un-filtered strut pressure measurements containing errors created by the resistance of strut telescopic movement caused by seal friction, to further average and correct the un-filtered pressure measurements into a single pressure value equivalent to the amount of supported weight, and deliver a more accurate computation of total aircraft weight, to an airline.

Referring now to FIG. 3a, there is shown an apparatus block diagram illustrating first off-aircraft computer 15, with wireless data communication functions and various software programs; being part of the apparatus of the invention. First off-aircraft computer 15 is equipped with an internal clock and calendar, to reference the date and time for acknowledgment and receipt of landing gear data captured and transmitted wirelessly from on-aircraft computer 8 (shown in FIG. 1). Data acquisition functions of the first off-aircraft computer 15 include the reception of strut pressure and rotation sensor measurements from on-aircraft computer 8 for NLG 3, LMLG 4, and RMLG 5 (shown in FIG. 1)

First off-aircraft computer 15 has multiple data acquisition, processing, filtering, storage and $2^{nd}$ Transmission functions (illustrated in FIG. 4a, 4b; with Steps described in FIG. 5a) which include:
  Data Acquisition function "Theta" receives from on-aircraft computer 8 (shown in FIG. 1) date and time stamped measurements of NLG, LMLG and RMLG landing gear strut pressure.
  Data Acquisition function "Iota" receives from on-aircraft computer 8 (shown in FIG. 1) date and time stamped measurements of NLG, LMLG and RMLG torque-link rotation.

First off-aircraft computer 15 has multiple operating software programs and algorithms, which include:
  Software Program "Kappa" (described in FIG. 4) identifies the timing and sequence for capture of strut pressure oscillations from each landing gear, and also identifies the range of pressure oscillations, identifying a maximum high-peak pressure and a minimum low-peak pressure measurement recorded during aircraft movement.

Software Program "Lambda" (described in FIG. 4a) reviews and filters the received raw pressure data to recognize ultra-high-peak pressures that are beyond the typical high-peak pressure values maintained within the Centralized Data-base, associated with that specific landing gear strut design and O-ring seal configuration; and characterized those measurements as high-pressure outliers, (identified as psi delta "D"). The ranges between landing gear ultra-low-peak pressures and typical low-peak pressures to be characterized as low-pressure outliers (identified as psi delta "E"). Peak-pressure outliers are filtered and removed from further algorithms; and not included in subsequent friction correction computations.

Software Program "Mu" (described in FIGS. 4a and 4b) further reviews and filters the identified pressure range between psi delta "D" and psi delta "E" to recognize the pressure range of non-outlier high-peak pressure and non-outlier low-peak pressure measurements recorded during aircraft movement, to be classified as fully-filtered strut pressure oscillations, and further categorized as the refined psi delta "F."

Software Program "Nu" (described in FIG. 4b) computes the value of psi delta "F" which is proportional to the amount of weight supported by the internal gas within the strut, net of the pressure distortions caused by seal friction, with simultaneous computations made for NLG, LMLG and RMLG.

Software Program "Xi" processes the fully-refined pressure data (using benefit of Nance—U.S. Patent Application No. 62/121,824; filed Sep. 1, 2015) from the respective NLG and MLGs to resolve for pressure errors induced by landing gear strut seal friction, to compute a corrected strut pressure, associated with the weight supported at each respective landing gear. A computed weight from the respective landing gear is established and summed to determine the total weight of the aircraft.

Software Program "Omicron" which is a multi-layered look-up table used to compare current pressure and rotation data profiles from respective landing gear struts, and cross-references the pressure patterns to recent, past and long-past pressure data profiles from identical landing gear struts, operated by multiple airlines. Identification of pressure anomalies found outside of the historical pressure profiles, which could signal unexpected binding of the landing gear strut seals, which might distort subsequent friction measurements and corrupt weight determinations in the future. The program captures pressure profiles of a single aircraft, where that aircraft could potentially exchange one or more of its landing gear with a different landing gear from a different aircraft of the same type and model. A record is made of the different landing gear strut having different break-out friction patterns. Software Program "Omicron" also compares profiles of break-out friction from a single landing gear to be stored and cataloged with break-out friction values from numerous other aircraft within an airline's vast fleet of aircraft, which are operating numerous identical aircraft with identical landing gear strut designs.

Software Program "Pi" computes and identifies the net weight of passengers/carry-on items and checked bags from an airline's specific flight, route, time of day, and season of the year. The total departure weight of the aircraft is measured. Known and measured weight amounts, which are not related to passengers/carry-on items and checked baggage are subtracted from the measured aircraft departure weight. Weight subtractions include:

the previously measured and known empty weight of the aircraft, increased by the airline to the typical "operating empty weight" of the aircraft, which includes the empty aircraft weight plus the known weight of items stored within each seat-back such as aircraft safety cards, flight magazines and other published materials, potable water on-board the aircraft, and other aircraft and over-water route specific items such as life rafts and other safety equipment;

the fuel truck measured and cockpit indicated weight of the fuel pumped into the aircraft fuel tanks;

the measured and known weight of all catering items, provided for passenger consumption on the aircraft;

the surveyed and known average weight of the flight and cabin crew, with crew carry-on baggage;

the measured weight of specific cargo items loaded onto the aircraft;

resulting in a net weight amount associated with the total number of passengers/carry-on items and checked bags. The net weight associated with the passengers/carry-on items and checked bags are allocated into two separate categories:

weight of the passengers/carry-on items weight of the checked bags

Two alternating algorithms are processed to refine the average passenger/carry-on items and average checked bag weights. The computations of the first algorithm have the FAA's most recent assumption for each of the checked bag "average weight" and applied at 28.9 pounds per bag. (28.9 pounds is used by example as the amount currently used. The assumed checked bag weight may vary as survey data prescribes) The 28.9 pound value is multiplied times the number of bags recorded on the flight manifest, with that checked bag weight amount being subtracted from the net passengers/carry-on items and checked bags weight amount. The resulting value is divided by the number of passengers recorded on the flight manifest, to determine the weight for the average passenger.

The computations of the second algorithm have FAA's most recent assumption for each passenger weight at 190 pounds per passenger. (190 pounds is the Summer weight value and is used by example as the amount currently used. The assumed passenger/carry-on items weight may vary as survey data prescribes) The 190 pound value is multiplied times the number of passengers recorded on the flight manifest, and that passenger/carry-on items weight amount being subtracted from the net passengers/carry-on items and bags weight value. The resulting value is divided by the number of checked bags recorded on the flight manifest, to determine the value for the average checked bag weight. The resulting average passenger/carry-on items and checked bag weights are recorded within a reference library maintained by the Central Data Service provider, to be further compared to subsequent flights with passengers/carry-on items and checked baggage weight determinations.

Many airlines weigh checked bags. Thus, the weight of the checked bags can be summed and recorded and provided to Program "Pi" for further refinement and accuracy in determining average passenger and carry-on baggage weights.

Airlines operating 700+ aircraft, with typical aircraft utilization of six flights per day, have approximately 4,200 departures per day. The two algorithms described are processing to determine average passenger and checked bag weights, thousands of times each day, allowing the airline's daily departures to act as automated-surveys to determine average passenger/carryon items and checked bag weights. The surveyed weight data is recorded and referenced by the departure city and destination city, (typically referred to as the "city pairs"), time of day, and season of the year; to subsequently be used by various airlines as a load planning tool, to better anticipate and predict the weight of a fully loaded aircraft, before the aircraft departure weight is measured.

First off-aircraft computer 15 has data transmission capabilities, which include:

Data Transmission function "Rho" which communicates aircraft weight, CG or other products related to landing gear strut pressure to airline computer 21 (shown in FIG. 1).

Figure 4:
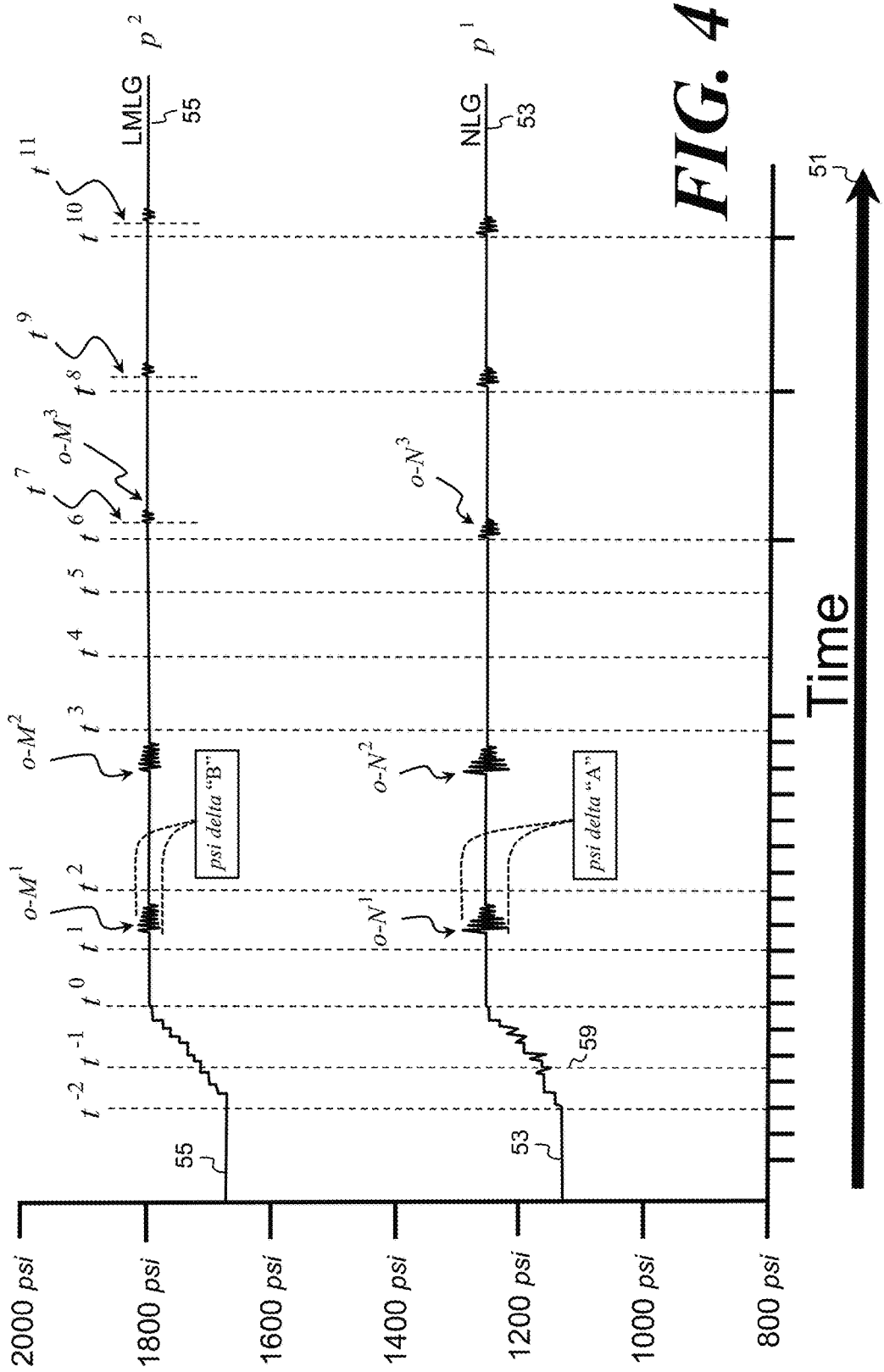
FIG. 4 is a graph showing NLG and LMLG strut pressure profiles over elapsed time, recorded then transmitted from an on-aircraft computer, for time periods including: pre-departure, departure and post-departure activities at an airport gate; detecting strut pressure oscillations as strut seal friction is initially overcome; and showing strut pressure oscillations during an aircraft bounce as the aircraft passes over un-even sections of the airport taxi-way.

Referring now to FIG. 4, there is shown a graph illustrating changes in measured pressure within the NLG and LMLG (RMLG not shown) over elapsed time. Un-filtered landing gear data, which is captured and shown herein, is collected by an on-aircraft computer 8 (shown in FIG. 1).

A method is shown for verification and validation that break-out friction of the aircraft landing gear strut has been recognized and overcome, in accordance with the first embodiment. Landing gear strut pressures are monitored during a typical pre-departure loading of the aircraft and followed by a gate departure with aircraft taxi from the gate. Landing gear strut pressure is shown as increasing vertically from the left side of the graph with a range in pressure from 800 psi through 2000 psi. Pressure changes are shown in relation to elapsed time, with the passage of Time is shown as the horizontal arrow 51 pointing to the right, across the bottom of the graph.

In the example shown, pressure measured from the NLG is shown as horizontal line 53. Pressure measured from the LMLG is shown as horizontal line 55 (RMLG pressure is not shown). The portion of aircraft weight (and added weight) supported by the NLG corresponds to a strut pressure measurement at the beginning of line 53 (also identified as pressure profile line $p^1$) of approximately 1,160 psi. The portion of aircraft weight (and added weight) supported by the LMLG corresponds to a strut pressure measurement at the beginning of line 55 (also identified as pressure profile line $p^2$) of approximately 1,670 psi.

The period of time of data, which is transmitted off the aircraft to off-aircraft computer 15 has a start time and an end time. The start time is initiated by an event trigger. Various starting event triggers can be used, such as release of the parking brake or the determination of pressure oscillations (psi deltas "A" and "B" as shown in FIG. 4). The end time can be a fixed duration or a stop trigger. In the preferred embodiment, data is continually measured and stored. The memory is finite and only the oldest data is overwritten with new data. This allows detection of pressure oscillations and retrieval of data occurring earlier in time. For example, if psi deltas "A" and "B" are detected and used as an event trigger, data occurring just prior to the pressure oscillations is included in the period of time and transmitted.

Shown in FIG. 4 are multiple vertical dashed-lines, labeled as time-markers (as an example: $t^1$) along the passing Time arrow 51; each intersecting NLG pressure profile $p^1$ and LMLG pressure profile $p^2$ at subsequent points in time. Segments of pressure measurements identified and captured along the passage of Time are identified between the time-markers: $t^{-2}$, $t^{-1}$, $t^0$, $t^1$, through $t^{11}$. Changes in the measured angle of the landing gear torque-link by rotation sensor 45 (shown in FIG. 2) are recorded at parallel time-markers, for which landing gear pressure measurements are captured.

Time-markers $t^{-2}$ through $t^0$ identify the period of aircraft loading, prior to the initial release of the parking brake. Time-marker $t^{-2}$ is typically set at 40 minutes prior to $t^1$, being the point in time for Software Epsilon to look backwards in time from $t^1$ to identify the previously recorded pressure data as the aircraft loads with passengers, taking into consideration that most airlines begin passenger loading 30 minutes prior to gate departure.

NLG strut pressure profile $p^1$ is shown with an initial stair-stepped line 53 moving upward as weight is added, followed by periodic pressure reversals. These pressure reversals occur when weight enters the aircraft through the cabin door, located above the NLG, then moves aft away from the NLG. NLG strut pressure profile $p^1$ progresses to the right, along time-line 51. LMLG strut pressure profile $p^2$ shows a similar stair-stepping of line 55. The stair-stepping patterns of pressure increases along NLG line $p^1$ and LMLG line $p^2$ are produced from the initial release of break-out friction, allowing the strut to telescopically compress; followed by a re-establishment of the seal friction resistance, which will then maintain a stabilized pressure until enough additional weight is applied to again overcome the break-out friction, causing another rise in pressure, as the strut continues to compress.

Software Program "Epsilon" (shown in FIG. 3), which is configured to detect minor pressure reversals of the smaller NLG, shown by vertical dotted line 59 at time-maker $t^{-1}$ while no change is detected in pressure to the much larger LMLG; as merely the weight of passengers who have entered the aircraft through cabin door 2 located above the NLG (shown in FIG. 1), and having moved aft in the aircraft cabin away from the NLG and towards the LMLG. The NLG pressure will increase and decrease during the loading process, where typically the MLGs will only see increasing pressure during the loading process.

Software Program "Zeta" (which initiates later) is assigned with the task for execution of landing gear data collection and packaging, commencing with time-marker $t^0$ by a signal from cabin door indicator 10 of the closing of the cabin door 2, followed by a signal from parking brake indicator 9 of the initial or first release of the aircraft parking brake $t^1$ (shown in FIG. 1). The use of closing of the cabin door is optional. This signal can be used to ready for the release of the parking brake.

Software Program "Epsilon" continues with a search for oscillations along NLG pressure profile $p^1$, indicating the commencement of pressure pattern—psi delta "A" also referenced as oscillation-NLG "o-$N^1$" which confirms aircraft 1 horizontal movement and slight vertical movement 33 of the aircraft nose (shown in FIG. 1a). Software Program "Epsilon" searches for oscillations along LMLG pressure profile $p^2$, indicating the commencement of pressure pattern—psi delta "B" also referenced as the oscillation-LMLG "o-$M^1$." Typically the MLGs support 90% of the aircraft weight, with 10% of the weight supported by the NLG. With the majority of weight supported by the MLGs, pressure pattern—psi delta "B" identifies a lesser amount of pressure oscillation.

Software Program "Epsilon" continues with a search for oscillations in measurements from rotation sensors 45

(shown in FIG. 2) attached to respective landing gears 3, 4 and 5; corresponding with respective strut pressure changes; as a cross-reference to confirm telescopic movement of the respective landing gear.

Time-marker $t^1$ is the recognition of the release of aircraft parking brake and indicates when aircraft 1 commences the initial pushed-back from the gate. As tug 27 (shown in FIG. 1a) begins the push of aircraft 1, there will be a sudden shift of suspended weight between NLG and combined MLGs. The transfer of the suspended weight will slightly rock the aircraft, which generate oscillations NLG o-$N^1$ and MLG o-$M^1$. As aircraft 1 continues to move horizontally, NLG and MLG pressures will subsequently stabilize due to the resistance by strut seal friction, applying opposition to NLG and LMLG telescopic movement, thus ceasing the pressure oscillations.

Pressure pattern—psi delta "A" shown as NLG pressure oscillation o-$N^1$ recognize the initial pressure oscillation, followed by multiple oscillations with a continued decline in high-peak and low-peak range of pressure oscillations, along line 53 being NLG $p^1$.

Pressure pattern—psi delta "B" shown as LMLG pressure oscillation o-$M^1$ recognize the initial pressure oscillation, followed by multiple oscillations with a continued decline in high-peak and low-peak range of pressure oscillations, along line 55 being LMLG $p^2$.

As aircraft 1 completes the push-back from the gate, an abrupt stop generates a second transfer or rocking of suspended weight from NLG to MLGs, repeating the pressure oscillations shown as NLG o-$N^2$ and MLG o-$M^2$. Time-marker $t^3$ is identified by the re-setting of the aircraft parking brake. Ground personnel then remove tow-bar 29 connected to tug 27 from aircraft 1 and clear the area around aircraft 1 making it ready for taxi away from the gate area.

Time-marker $t^4$ is identified by the second release of the aircraft parking brake as the aircraft readies for taxi towards the take-off runway. Time-marker $t^4$ triggers commencement of an additional 45-seconds of landing gear data measurements, until time-marker $t^5$. The choice of 45-seconds of elapsed time is used as an example, where the aircraft operator may select an alternate period for time-marker $t^5$. Time-marker $t^5$ acknowledges the conclusion for the $1^{st}$ Transmission data package. The un-filtered data is packaged and sent by wireless transmission, shown as solid-arrow 13 (shown in FIG. 1) from on-aircraft computer 8 to first off-aircraft computer 15.

As aircraft 1 moves horizontally away from the gate area, it will roll over expansion joints within the concrete taxi-way. These expansion joints are often un-even sections of the taxi-way and cause aircraft 1 to bounce as it passes over the sometimes un-aligned seams in the concrete. As aircraft 1 moves horizontally, NLG 3 will first encounter the un-even expansion joint, shown at time-marker $t^6$, followed immediately by the MLGs 4 and 5 encountering the same un-even expansion joint at time-maker $t^7$. Landing gear strut pressure will initially oscillate as the suspended weight of the aircraft bounces over the concrete expansion joints, until resistance from strut frictional forces stabilize the strut pressure. Pressure oscillations shown as NLG o-$N^3$ and MLG o-$M^3$ are identified by their stagger along time-arrow 51, lesser in range between the high-peak and low-peak pressures; and cataloged as the profile patterns for bumps along the taxi-way. Time-markers $t^8$ and $t^9$ are repeat patterns of time-markers $t^6$ and $t^7$ as the aircraft encounters the next un-even expansion joint. Time-markers $t^{10}$ and $t^{11}$ are repeat patterns of time-markers $t^8$ and $t^9$ as the aircraft encounters the next un-even expansion joint. These patterns of strut pressure oscillations will continue for a number of occurrences, until the aircraft reaches the beginning of the runway for take-off.

The potential of NLG pressure oscillation before the release of the parking brake at time-marker $t^1$ is noted and accounted for in Software Program "Epsilon". The recognition of the specified time-markers and capture of landing gear strut pressure through the oscillation periods, along with identification of torque-link angle changes, complete the definitions of Software Program "Epsilon".

Upon recognition of time-marker $t^5$ Software Program "Zeta" (shown in FIG. 3), executes the capture and packaging of the un-filtered landing gear data along time-arrow 51 from time-markers $t^{-2}$ through $t^5$.

Also, upon recognition of time-marker $t^5$ and after the packaging of strut data, Software Program "Eta" (shown in FIG. 3) completes the $1^{st}$ Transmission of captured landing gear data to first off-aircraft computer 15.

Referring now to FIG. 4a, there is shown an enlarged section of LMLG 4 pressure profile $p^2$ along line 55, between time segments $t^1$ through $t^7$ (previously described in FIG. 4). Landing gear data captures shown herein are formulated by Software Programs "Alpha-Eta", residing within on-aircraft computer 8 (shown in FIG. 3), with subsequent processing and filtering described herein, are formulated by Software Programs "Kappa-Xi", residing within first off-aircraft computer 15 (shown in FIG. 3a).

Software Programs "Kappa and Lambda", residing within first off-aircraft computer 15 (shown in FIG. 3a) review pressure profile $p^2$ between time-markers $t^1$ and $t^2$ to identify the range of ultra-high-peak pressure vs. ultra-low-peak pressure oscillation is shown as psi delta "B" with pressure outliers shown as psi delta "D" and psi delta "E". Pressure outliers are identified as the pressure anomalies, which are outside of a pre-determined high-peak pressure threshold and low-peak pressure threshold. The pre-determined threshold may be changed, if desired. The pressure outliers are recorded and subsequently removed; thus not used in later algorithms to identity the amount of strut seal friction; but retained as reference materials in future evaluation for the determination of peak pressure outlier values.

Landing gear beak-out friction is not symmetrical. The O-ring seals of today's landing gear strut have characteristics, which show friction values progressively higher as pressure within the strut increases, and progressively lower as pressure within the strut decreases. These asymmetrical characteristics are illustrated by the slightly greater separation in the boundary lines of psi delta "D" shown on the higher-pressure range, to the slightly lesser separation in the boundary lines of psi delta "E" shown on the lower-pressure range. The pressure ranges within the limits of psi delta "D" and psi delta "E" will change with different environmental conditions such as temperature and humidity; as well as different weight ranges supported by the landing gear. When pressure increases within the strut, the seal materials deflect in shape to retain the higher pressures, thus frictional forces are slightly increased as the strut begins to compress. When pressure reduces within the strut, the seal materials deflect in an opposing direction to release with the lower pressures, thus frictional forces are slightly decreased as the strut begins to extend.

Filtering to remove the ultra-high-peak pressure outliers and ultra-low-peak pressures outliers allow for Software Programs "Mu" (described in FIG. 4a) to identify a refined pressure range, allowing Software Program "Nu" to average the tighter and reduced pressure range associated with break-out friction, thus allowing more efficiency in identifying the average or mean pressure values associate with a landing gear pressure, net of seal friction errors.

Referring now to FIG. 4b, there is shown a further enlarged section of LMLG 4 pressure pattern profile $p^2$ between time segments $t^1$ through $t^5$ (previously shown in FIG. 4a). Landing gear data captures shown herein are captured and transmitted by Software Programs "Alpha-Zeta" residing within on-aircraft computer 8 (shown in FIG. 3) as the $1^{st}$ Transmission of data, with subsequent processing and filtering described herein, are formulated by Software Programs "Kappa-Xi" residing within first off-aircraft computer 15 (shown in FIG. 3a).

Software Program "Mu" continues a review of pressure profile $p^2$ between time-markers $t^1$ and $t^3$ are shown psi delta "D" and psi delta "E". Once the ultra-high and ultra-low pressure anomalies and outliers from psi delta "D" and psi delta "E" are filtered and eliminated, the resulting range of high-peak pressure and low-peak pressure oscillation are averaged by Software Program "Nu" and shown as psi delta "F". The oscillating pressures of psi delta "F" are averaged to determine a single value of landing gear strut pressure for LMLG 4, which is net of the distortions of strut seal friction.

The continuation pressure profile shown along line $p^2$ to the right of the illustration of psi delta "F" is not the computed averaged of psi delta "F" (the line shown is not centered by the average); but instead the continued pressure measurement from pressure sensor 43 (shown in FIG. 2). The computed average of psi delta "F" can only be determined from the averaging of the actual refined pressure measurements. Horizontal dashed line $p^{nf}$ (pressure$^{net\ of\ friction}$) begins at $t^2$ and ends at $t^3$ which isolates the time segment for identification and removal of pressure outliers followed by averaging for those non-outlier pressure measurements within psi delta "F". Dashed line $p^{nf}$ represents the median pressure within the range of psi delta "F".

The differential pressure (measured as psi) between the median pressure shown by $p^{nf}$ to either the high-peak or low-peak pressure values of psi delta "F"; multiplied times the area of the horizontal cross-section within the landing gear strut, equals to the amount of the friction error recognized in pounds. Measurement recorded in pounds can be converted to kilograms by dividing the pound measurement by 2.2046.

1,000 lb.÷2.2046=453.59 kg

Figure 5:
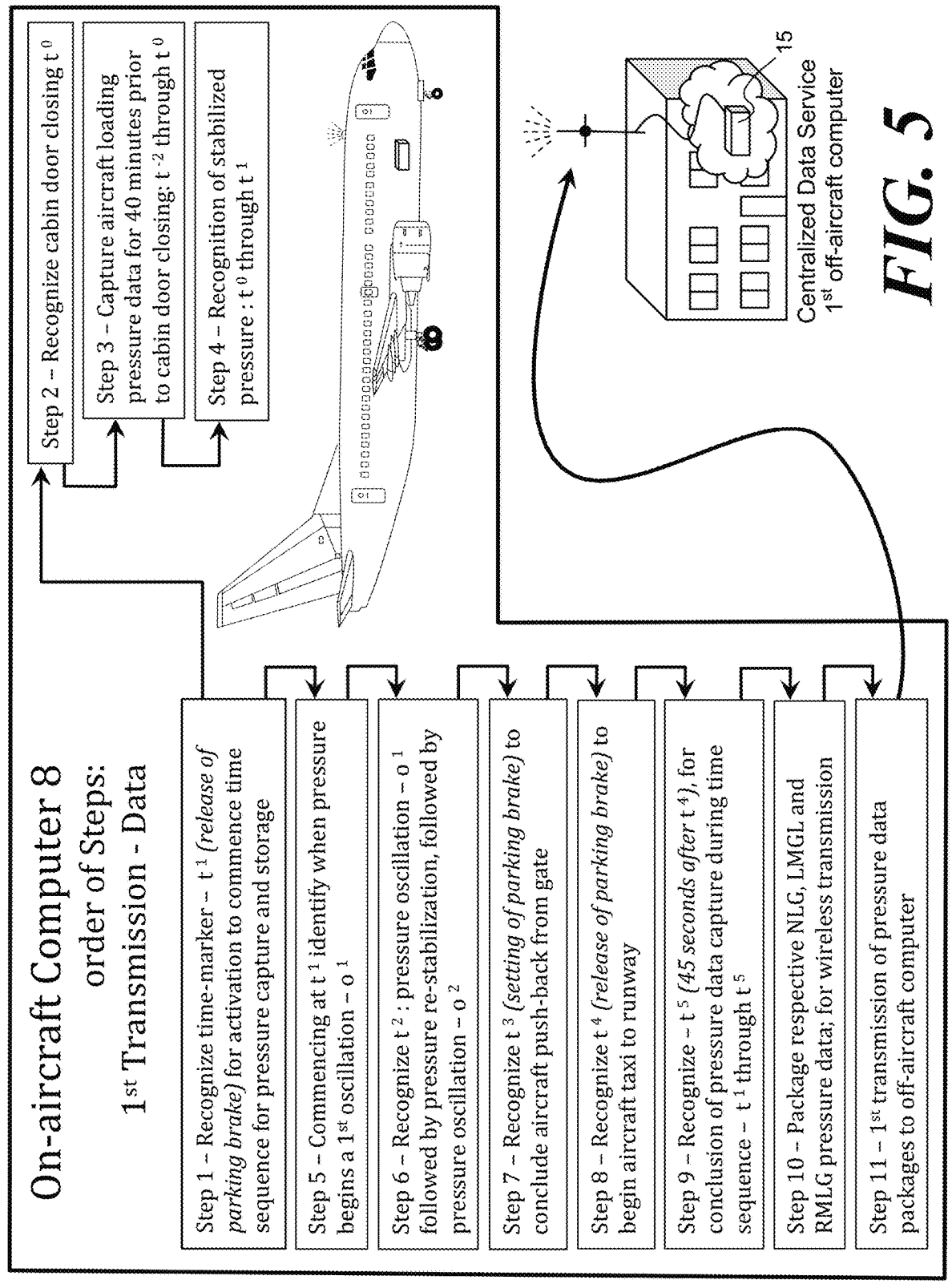
FIG. 5 is an alternate view of the block diagram of the on-aircraft computer shown in FIG. 3 illustrating the functions related to a 1st Transmission of landing gear data subsequent to identifying and implementing a specific time sequence to commence and conclude the capture of un-filtered strut pressure and rotation sensor data during the aircraft push-back from the airport gate, and 1st Transmission of data to the first off-aircraft computer.

Pressures (and rotation data) from time-marker $t^1$ through time-marker $t^5$ are recorded and stored into a data package to be wirelessly transmitted from on-aircraft computer 8 (shown as 1st Transmission of data, in FIG. 5).

Referring now to FIG. 5, there is shown an illustration of Steps 1-11 taken in preparation for the $1^{st}$ Transmission—Data from on-aircraft computer 8 to first off-aircraft computer 15. Steps shown are for the timing and sequence for landing gear data capture for NLG 3 and LMLG 4 (shown in FIG. 3 and illustrated in FIG. 4), (RMLG 5 not shown).

Step 1.—Recognition of time-marker $t^1$ (initial release of the aircraft parking brake) commencing a specific sequence for the capture of measured pressure and torque-link rotation data for the period of time of beginning, at $t^{-2}$ (start of the aircraft loading process, 40-minutes earlier) and concluding at $t^5$ (shown in FIG. 4).

Step 2.—Recognition of time-marker $t^0$ (closing of the cabin door) confirming the cabin door is closed, before the initial release of the parking brake.

Step 3.—Capture from memory-loop of the prior 40-minutes of measured strut pressure and torque-link rotation data from $t^{-2}$ through the cabin door closing $t^0$.

Step 4.—Recognition of a stabilized strut pressure and no torque-link rotation, during the period from $t^0$ through the release of the aircraft parking brake $t^1$.

Step 5.—Commencing from the release of the aircraft parking brake $t^1$, recognition of when respective strut pressures are no longer stable and begin their first oscillation $o^1$ (oscillation $o^1$ refers to pressure reversals within NLG, LMLG and RMLG, shown in FIG. 4).

Step 6.—Recognition of time-marker $t^2$ identified with the initial respective pressure oscillations $o^1$, and followed by a period of stabilized pressure, then followed by subsequent pressure oscillations $o^2$ (oscillation $o^2$ refers pressure reversals within NLG, LMLG and RMLG, shown in FIG. 4) being the pressure profile period which concludes at time-marker $t^3$ (re-set of the aircraft parking brake). The period of stabilized strut pressure between pressure oscillation $o^1$ and pressure oscillation $o^2$ results from the resistance of strut seal friction, impeding telescopic movement of the strut, with strut pressures becoming vertically stable as the aircraft is slowly pushed away from the airport gate. As the tug subsequently stops, the aircraft will slightly rock transferring weight forward and aft, causing the NLG and LMLG and RMLG to move telescopically and re-start oscillations. Telescopic movement of each strut is shown by strut pressure oscillations $o^1$ and pressure oscillations $o^2$. Pressure oscillation $o^1$ and pressure oscillation $o^2$ are the essential un-filtered data sets, which are packaged and transmitted from on-aircraft computer 8, to be used by the first off-aircraft computer 15 to correct for landing gear strut seal friction, and further determination of aircraft weight and CG.

Step 7.—Recognition of time-marker $t^3$ (re-setting of the parking brake) which concludes the aircraft push-back from the gate. During the period immediately after time-marker $t^3$, ground personnel detach the aircraft from tow-bar 29 and tug 27 (shown in FIG. 3a).

Step 8.—Recognition of time-marker $t^4$ (second release of the aircraft parking brake) signaling the aircraft is ready for taxi.

Step 9.—Recognition of time-marker $t^5$ as a period of 45-seconds after $t^4$, while the aircraft is taxiing away from the gate. During this period, the landing gear strut pressures again may again oscillate (not shown), allowing for more pressure data to be captured and used in correcting for landing ear strut seal friction (45-seconds is used as an example, where a different period of time may be selected).

Step 10.—Time-marker $t^5$ also instructs on-aircraft computer 8, Software Program "Zeta" (shown in FIG. 3), to execute the landing gear data capture along time-line 51 for time-markers $t^{-2}$ through $t^5$.

Step 11.—Time-marker $t^5$ also instructs on-aircraft computer 8, Software Program "Eta" to execute packaging and $1^{st}$ Transmission of captured landing gear pressure and torque-link rotation data from on-aircraft computer 8 to first off-aircraft computer 15.

Specific periods for time-markers described herein are use only as examples, where different aircraft operators with different aircraft types may choose to shorten or lengthen the time periods associated with the various time-markers $t^{-2}$ through $t^{11}$.

Figure 5A:
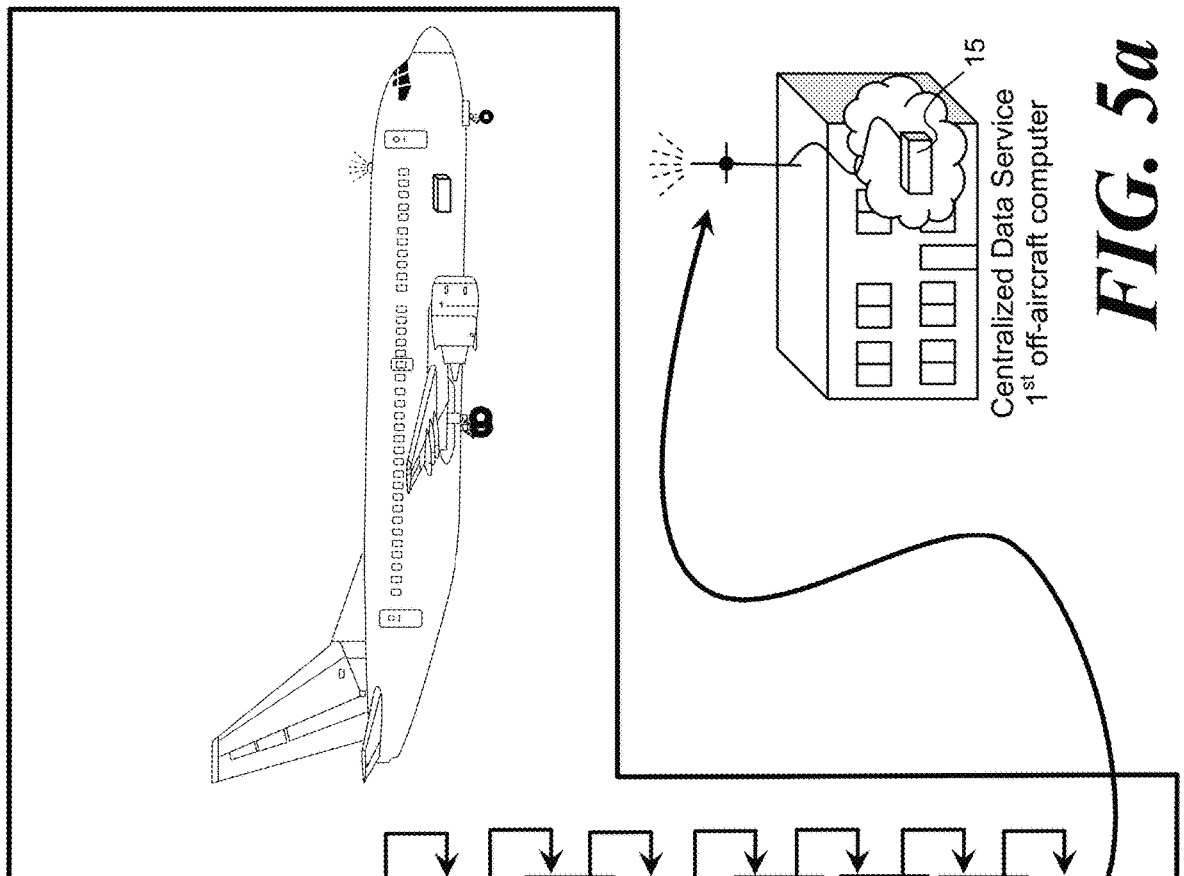
FIG. 5a is an alternate view of the block diagram of the on-aircraft computer shown in FIG. 3 illustrating the functions related to the $2^{nd}$ Transmission of landing gear data identifying and implementing the sequence to commence and conclude the capture of un-filtered strut pressure and rotation sensor data during the aircraft taxi from the airport gate, with aircraft's slight bump as it passes over un-even sections of the taxi-way.

Referring now to FIG. 5a, there is shown an illustration of Steps 12-19 taken for a $2^{nd}$ Transmission—Data from on-aircraft computer 8 to first off-aircraft computer 15. Steps shown are for the timing and sequence for landing gear data capture for NLG 3 and LMLG 4 (shown in FIG. 3a and illustrated in FIG. 4), (RMLG 5 not shown).

Step 12.—Recognition of time-marker $t^6$ identifying the commencement of NLG pressure oscillation o-$N^3$ generated by a bumping of aircraft 1, as NLG 3 passes over an un-even portion of the airport taxi-way.

Step 13.—Recognition of time-marker $t^7$ identifying the commencement of MLG pressure oscillation o-$M^3$ generated by a bumping of aircraft 1, as LMLG 4 passes over an un-even portion of the airport taxi-way.

Step 14.—Recognition of time-marker $t^8$ which is a duplication of Step 12, generated by a supplemental bumping of aircraft 1, as NLG 3 passes over another un-even portion of the airport taxi-way.

Step 15.—Recognition of time-marker $t^9$ which is a duplication of Step 13, generated by a supplemental bumping of aircraft 1, as LMLG 4 passes over another un-even portion of the airport taxi-way.

Step 16.—Recognition of time-marker $t^{10}$ which is a duplication of Step 12, generated by a supplemental bumping of aircraft 1, as NLG 3 passes over another un-even portion of the airport taxi-way.

Step 17.—Recognition of time-marker $t^{11}$ which is a duplication of Step 13, generated by a supplemental bumping of aircraft 1, as LMLG 4 passes over another un-even portion of the airport taxi-way.

Step 18.—Is a duplication of Step 10 (shown in FIG. 5) with the capture and packaging of additional landing gear pressure and torque-link rotation data.

Step 19.—Is a duplication of Step 11 (shown in FIG. 5) $2^{nd}$ Transmissions Data of captured landing gear pressure and torque-link rotation measurements from on-aircraft computer 8 to first off-aircraft 15. Pressures (and rotation data) from time-marker $t^6$ through time-marker $t^{11}$ are recorded and stored into a data package to be wirelessly transmitted from on-aircraft computer 8 as a $2^{nd}$ Transmission of data.

The additional Steps 13-17 for the $2^{nd}$ Transmission of landing gear pressure and torque-link rotation data are compared to the previous Steps 5-9 for the $1^{st}$ Transmission-Data, and are used to validate the findings from the $1^{st}$ Transmission—Data for each respective strut. This comparison is not measured against other landing gear friction patterns, from other aircraft, but limited to only the single aircraft and is a cross-check function for the respective landing gear of this single aircraft. The provision of a $2^{nd}$ Transmission of data is optional.

Figure 6:
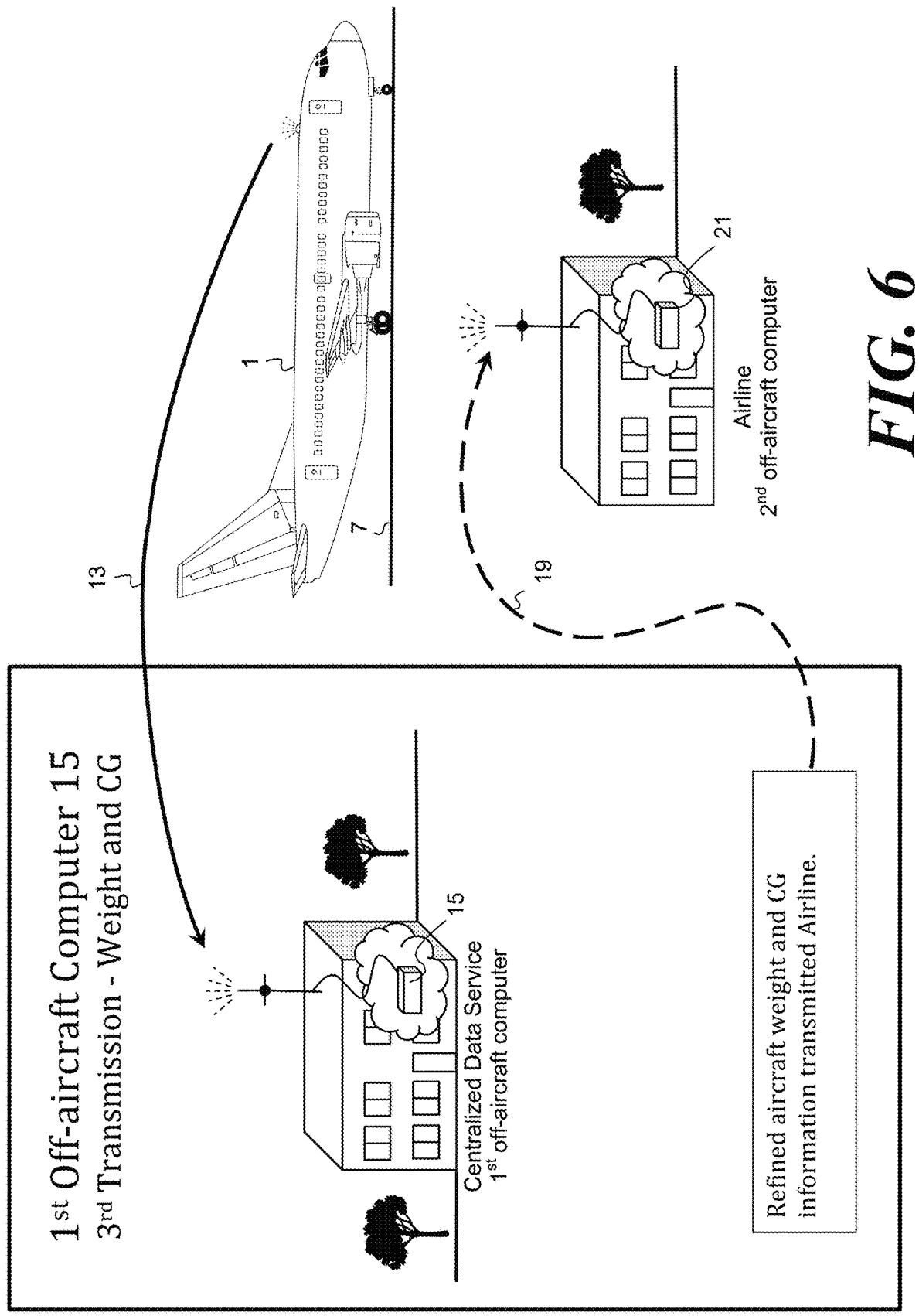
FIG. 6 is a diagram illustrating the $3^{rd}$ Transmission from the Centralized Data Service first off-aircraft computer, of refined aircraft weight and CG data, to the airline.

Referring now to FIG. 6, there is shown an illustration of the Step taken for the $3^{rd}$ Transmission—Weight and CG information from Centralized Data Service 17, from first off-aircraft computer 15; of the products and/or services described herein (using benefit of Nance—U.S. patent application Ser. No. 15/388,440; filed Dec. 22, 2016), received by the airline's second off-aircraft computer 21. (FIG. 6 and the following FIG. 7 can be better comprehended when viewed with the illustrations of FIG. 1, FIG. 1a, FIG. 6 and FIG. 7 concurrently) Solid arrow 13 represents the wireless transmission of un-filtered landing gear data received from on-aircraft computer 8, to first off-aircraft computer 15. Dashed arrow 19 represents the summarized, filtered and processed data; refined and summarized into weight and CG information, weight and CG validation information, weight and CG invalidation information; and/or comparison of airline's determined take-off weight to that of the aircraft's certified Maximum Take-off Weight limitation and airport runway length Take-off Performance limitations (defined in FAA Part 121.696 [a] [1-4] shown above in Background of the Invention) transmitted from Centralized Data Service first off-aircraft computer 15, to the airline's second off-aircraft computer 21.

Figure 7:
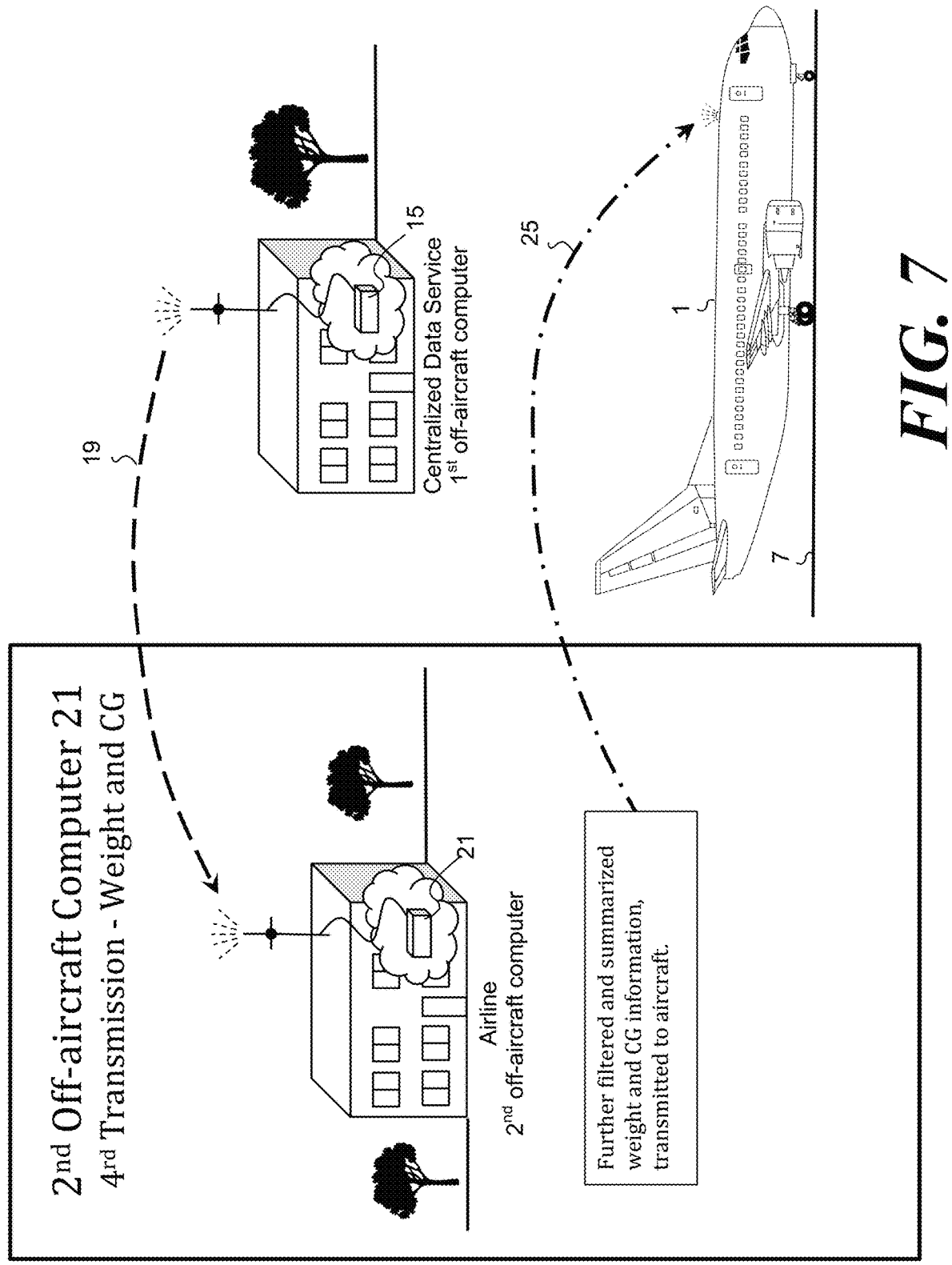
FIG. 7 is a diagram illustrating the $4^{th}$ Transmission from the Airline second off-aircraft computer, which transmits weight and CG information back to the aircraft.

Referring now to FIG. 7, there is shown an illustration of the Step taken for the $4^{th}$ Transmission of weight and CG information, filtered and summarized by the airline, and sent from second off-aircraft computer 21 to the pilots of aircraft 1. The process shown within this FIG. 7 is part of the embodiment of this invention, but the data transmitted between airline and its pilots is determined by the airline; and shown only as the completion of the data-loop, with summarized weight and CG information delivered back to aircraft 1. Dashed-dotted arrow 25 represents the further filtered and summarized weight and CG information, transmitted from airline's second off-aircraft computer 21, to aircraft 1. On-aircraft computer 8 is not shown. The airline has an independent communication capability with its pilots on aircraft 1.

Although an exemplary embodiment of the invention has been disclosed and discussed, it will be understood that other applications of the invention are possible and that the embodiment disclosed may be subject to various changes, modifications, and substitutions without necessarily departing from the spirit and scope of the invention.

The invention claimed is:

1. An aircraft operation method of providing weight and center of gravity information for dispatching of the aircraft from an airport loading area for a flight of the aircraft, the aircraft having plural landing gear, the landing gear comprising telescoping landing gear struts that support the aircraft at the loading area, the landing gear having strut seals, the strut seals creating friction that interferes with free telescoping movement of the respective landing gear struts, the method comprising the steps of:

a. detecting an event trigger from operations of the aircraft at the loading area, the event trigger signaling departure of the aircraft from the loading area;
  b. after the detection of the event trigger, measuring and recording internal pressure from the respective landing gear struts with an on-aircraft computer;
  c. continuing to measure and record internal pressure from the landing gear struts for a period of time as the aircraft moves away from the loading area on ground;
  d. transmitting the recorded strut pressure measurements for the period of time to an off-aircraft computer;
  e. processing the transmitted recorded strut pressure measurements and correcting for the friction interference created by the strut seals, using the off-aircraft computer;
  f. determining a total weight of the aircraft and the aircraft center of gravity using the off-aircraft computer;
  g. providing the total weight of the aircraft and the aircraft center of gravity from the off-aircraft computer to an operator of the aircraft.

2. The aircraft operation method of claim 1 wherein the aircraft comprises a parking brake on wheels of at least one of the landing gear struts, wherein the step of detecting an event trigger from operations of the aircraft at the loading area further comprises the step of detecting release of the parking brake.

3. The aircraft operation method of claim 1 wherein the aircraft comprises a door for loading of passengers or cargo onto the aircraft, the step of detecting an event trigger from operations of the aircraft at the loading area further comprises the step of detecting closure of the door.

4. The aircraft operation method of claim 1 wherein the step of detecting an event trigger from operations of the aircraft at the loading area further comprises the step of detecting strut telescopic movement using the on-aircraft computer.

5. The aircraft operation method of claim 4, wherein the step of detecting strut telescopic movement using the on-aircraft computer further comprises the step of detecting pressure oscillations in at least one of the landing gear struts.

6. The aircraft operation method of claim 4, wherein at least one of the landing gear struts comprises torque-link arms, the step of detecting strut telescopic movement using the on-aircraft computer further comprises the step of detecting movement of the torque-link arms of the respective landing gear strut.

7. The aircraft operation method of claim 6 wherein the step of detecting movement of the torque-link arms of the respective landing gear strut further comprises use of a rotation sensor.

8. The aircraft operation method of claim 1 wherein the step of continuing to measure and record internal pressure from the landing gear struts for a period of time as the aircraft moves away from the loading area on the ground further comprises the step of ending the period of time upon the occurrence of a stop recording event.

9. The aircraft operation method of claim 8 wherein the aircraft comprises a parking brake on wheels of at least one of the landing gear struts, wherein the step of continuing to measure and record internal pressure from the landing gear struts for a period of time as the aircraft moves away from the loading area on the ground further comprises the steps of:
  detecting a release of the parking brake; and
  ending the period of time upon detection of the release of the parking brake plus a specified period of additional time, the detection of the release of the parking brake plus the specified period of additional time being the stop recording event.

10. The aircraft operation method of claim 8 wherein the step of continuing to measure and record internal pressure from the landing gear struts for a period of time as the aircraft moves away from the loading area on the ground further comprises the steps of detecting pressure oscillations in at least one of the landing gear struts and ending the period of time upon the end of a specific period of time, as the stop recording event.

11. The aircraft operation method of claim 8 wherein the step of transmitting the recorded strut pressure measurements for the period of time to the first off-aircraft computer further comprises transmitting the recorded strut pressure measurements upon the occurrence of the stop recording event.

12. The aircraft operation method of claim 1 wherein the event trigger is a first event trigger and the period of time is a first period of time, the method further comprising the steps of:
  a. detecting a second event trigger of aircraft movement that occurs after the first period of time and measuring and recording internal pressure from the landing gear struts for a second period of time. b. transmitting the recorded strut pressure measurements for the second period of time to the off-aircraft computer;
  c. processing the transmitted recorded strut pressure measurements for the second period of time using the off-aircraft computer and verifying the total weight of the aircraft and the aircraft center of gravity.

13. The aircraft operation method of claim 12 wherein the step of detecting a second event trigger of aircraft movement further comprises the step of detecting a re-setting of the parking brake followed by a second release of the parking brake.

14. The aircraft operation method of claim 12 wherein the step of detecting a second event trigger of aircraft movement further comprises the step of detecting strut telescopic movement using the on-aircraft computer.

15. The aircraft operation method of claim 14 wherein the step of detecting strut telescopic movement using the on-aircraft computer further comprises the step of detecting pressure oscillations in at least one of the landing gear struts.

16. The aircraft operation method of claim 15 wherein the step of measuring and recording internal pressure from the landing gear struts for a second period of time further comprises the step of measuring and recording plural sets of strut pressure oscillations as the aircraft moves over an uneven airport surface.

17. The aircraft operation method of claim 15 wherein the step of measuring and recording internal pressure from the landing gear struts for a second period of time further comprises the step of measuring and recording plural sets of strut pressure oscillations and further comprising the step of identifying nose landing gear strut pressure oscillations and corresponding lagging main landing gear strut pressure oscillations as horizontal movement of the aircraft over an uneven airport surface.

18. The aircraft operation method of claim 1 wherein the step of processing the transmitted recorded strut pressure measurements using the first off-aircraft computer further comprises the step of identifying strut pressure outliers, recognized as ultra-high-pressure peaks and ultra-low-pressure peaks within the pressure oscillation patterns, and removing the pressure outliers.

19. The aircraft operation method of claim 18, further comprising the steps of:
  a. providing a library database of landing gear friction patterns and pressure oscillation profiles;
  b. the step of processing the strut pressure measurements using the off-aircraft computer further comprises the step of comparing the strut pressure measurements to the library of landing gear friction patterns and pressure oscillation profiles;
  c. the step of determining the total weight of the aircraft and the aircraft center of gravity using the off-aircraft computer further comprises the step of using the comparison of strut pressure measurements to the library database of landing gear friction patterns and pressure oscillation profiles; and
  d. using a library database to identify a respective landing gear with irregular friction patterns.

20. The aircraft operation method of claim 19 further comprising the steps of:
  a. identifying recurring strut pressure outliers, associated to a single respective landing gear strut, in determining the single strut having irregular friction patterns;
  b. recording the respective single strut irregular friction patterns in the library database;
  c. communicating the irregular single strut friction pattern information to the operator of the aircraft.

21. The aircraft operation method of claim 1, the off-aircraft computer being a first off-aircraft computer, wherein the step of providing the total weight of the aircraft and the aircraft center of gravity from the first off-aircraft computer to an operator of the aircraft, further comprises the step of transmitting the total weight of the aircraft and the aircraft center of gravity from the first off-aircraft computer to a second off-aircraft computer used by the operator of the aircraft.

22. The aircraft operation method of claim 1 further comprising the step of determining whether to dispatch the aircraft for take-off, using the total weight of the aircraft and the center of gravity of the aircraft, using the off-aircraft computer.

23. The aircraft operation method of claim 22 further comprising the step of validating a planned aircraft take-off weight if the planned aircraft take-off weight or center of gravity is within the predetermined range.

24. The aircraft operation method of claim 23 further comprising the step of validating the planned aircraft take-off weight, if a measured aircraft weight is within ±2% of an aircraft's certified Maximum Take-Off Weight and Performance Take-off Weight and Center of Gravity Limitations.

25. The aircraft operation method of claim 22 further comprising the step of invalidating a planned aircraft take-off weight if the planned aircraft take-off weight or center of gravity is not within a predetermined range.

26. The aircraft operation method of claim 22 further comprising the steps of:
  a. determining and comparing the measured aircraft weight supported by the aircraft landing gear struts to a planned take-off weight determined by the operator of the aircraft, and determining if the planned aircraft weight is within a predetermined range of the measured aircraft weight;
  b. providing the total weight of the aircraft and the aircraft center of gravity from the off-aircraft computer to an operator of the aircraft for continued operations of the aircraft, further comprises the steps of:
    i. receiving the planned take-off weight determined by the operator of the aircraft,
    ii. determining if the aircraft operator's planned take-off weight is within the predetermined range of the measured weight, transmitting a message to the aircraft operator the planned take-off weight is valid,
    iii. determining if the planned take-off aircraft weight is not within the predetermined range of the measured weight, transmitting a message to the aircraft operator the planned take-off weight is not valid.

27. The aircraft operation method of claim 1 wherein the step of transmitting the recorded strut pressure measurements for the period of time to the off-aircraft computer further comprises the step of utilizing a wireless communications link.

28. The aircraft operation method of claim 27 wherein the step of transmitting the recorded strut pressure measurements for the period of time to the off-aircraft computer further comprises the step of utilizing a cellular telephone communications link.

29. The aircraft operation method of claim 27 wherein the step of transmitting the recorded strut pressure measurements for the period of time to the off-aircraft computer further comprises the step of utilizing a Wi-Fi communications link.

30. The aircraft operation method of claim 1 further comprising the step of determining an amount of friction of the landing gear strut seals, which friction inhibits accuracies in weight determinations, in a measurement scale correlated to pounds.

31. The aircraft operation method of claim 1 further comprising the step of determining an amount of friction of the landing gear strut seals, which friction inhibits accuracies in weight determinations, in a measurement scale correlated to kilograms.

32. An aircraft operation method of determining a weight of revenue payloads for a dispatching of the aircraft from an airport loading area for a flight of the aircraft, the aircraft have telescoping landing gear struts that support the aircraft at the airport loading area, the landing gear having strut seals, the strut seals creating friction that interferes with a free telescoping movement of the landing gear, the method comprising the steps of:
  a. detecting an event trigger from operations of the aircraft at the loading area, the event trigger signaling departure of the aircraft from the loading area;
  b. after the detection of the event trigger, measuring and recording internal pressure from the respective landing gear struts;
  c. continuing to measure and record internal pressure from the landing gear struts for a period of time as the aircraft moves away from the loading area on ground;
  d. using the off-aircraft computer, correcting for the friction interference created by the strut seals and determining a total weight of the aircraft from the internal pressures;
  e. a determining an operating empty weight of the aircraft;
  f. determining a weight of fuel onboard the aircraft at the loading area;
  g. determining a weight of non-passenger cargo onboard the aircraft at the loading area;
  h. determining a count of a number of passengers and passenger bags on the aircraft at the loading area;
  i. using the total weight of the aircraft, the operating empty weight of the aircraft, the fuel weight, the non-passenger cargo weight, and the number of passengers and passenger bags, determining a per passenger weight and per passenger bag weight;
  j. recording the per passenger weight and per passenger bag weight for the flight.

33. The aircraft operation method of claim 32 further comprising the step of determining and compiling an average weight of a passenger on the flight, with carry-on items.

34. The aircraft operation method of claim 32 further comprising the step of determining and compiling an average weight of a checked bag on the flight.

35. The aircraft operation method of claim 32 further comprising the step of determining a weight of revenue payload associated with a particular set of destination city pairs.

36. The aircraft operation method of claim 35 further comprising the step of determining the weight of revenue payload associated with a particular time of day.

37. The aircraft operation method of claim 35 further comprising the step of determining the weight of revenue payload associated with a particular season of a year.

* * * * *